(12) United States Patent
Yamamoto et al.

(10) Patent No.: US 10,340,549 B2
(45) Date of Patent: Jul. 2, 2019

(54) ELECTROLYTE AND BATTERY, AND ELECTRONIC DEVICE AND VEHICLE

(71) Applicant: SEIKO EPSON CORPORATION, Tokyo (JP)

(72) Inventors: Hitoshi Yamamoto, Chino (JP); Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 177 days.

(21) Appl. No.: 15/671,692

(22) Filed: Aug. 8, 2017

(65) Prior Publication Data

US 2018/0062200 A1 Mar. 1, 2018

(30) Foreign Application Priority Data

Sep. 1, 2016 (JP) .................................. 2016-170558

(51) Int. Cl.
| | | |
|---|---|---|
| *H01M 10/05* | (2010.01) | |
| *H01M 10/0562* | (2010.01) | |
| *H01M 10/0525* | (2010.01) | |
| *H01M 10/0585* | (2010.01) | |
| *H01M 10/052* | (2010.01) | |

(52) U.S. Cl.
CPC ..... *H01M 10/0562* (2013.01); *H01M 10/052* (2013.01); *H01M 10/0525* (2013.01); *H01M 10/0585* (2013.01); *H01M 2300/0077* (2013.01); *Y02E 60/122* (2013.01)

(58) Field of Classification Search
None
See application file for complete search history.

(56) References Cited

U.S. PATENT DOCUMENTS 9,034,525 B2 * 5/2015 Babic .................... C04B 35/486
429/206
2015/0056519 A1 * 2/2015 Ohta ................. H01M 10/0562
429/320

FOREIGN PATENT DOCUMENTS

| JP | 2009-215130 A | 9/2009 |
|---|---|---|
| JP | 2012-031025 A | 2/2012 |
| JP | 2015-041573 A | 3/2015 |

\* cited by examiner

*Primary Examiner* — Scott J. Chmielecki
(74) *Attorney, Agent, or Firm* — Oliff PLC

(57) ABSTRACT

A electrolyte is an electrolyte represented by the following formula (1):

$$(Li_{7-3x+y}Ga_x)(La_{3-y}Ca_y)Zr_2O_{12} \quad (1)$$

wherein $0.1 \leq x \leq 1$, and $0.01 \leq y \leq 0.5$.

11 Claims, 11 Drawing Sheets

|  | FORMULA (1) ||
|---|---|---|
|  | x | y |
| EXAMPLE 1 | 0.10 | 0.01 |
| EXAMPLE 2 | 1.00 | 0.10 |
| EXAMPLE 3 | 0.10 | 0.50 |
| EXAMPLE 4 | 1.00 | 0.50 |
| EXAMPLE 5 | 0.50 | 0.05 |
| EXAMPLE 6 | 0.40 | 0.07 |
| COMPARATIVE EXAMPLE 1 | 0.05 | 0.01 |
| COMPARATIVE EXAMPLE 2 | 0.07 | 0.50 |
| COMPARATIVE EXAMPLE 3 | 0.60 | 0.00 (NO Ca) |
| COMPARATIVE EXAMPLE 4 | 0.50 | 0.70 |

FIG. 4

| | BULK DENSITY [%] | BY-PRODUCT | LITHIUM ION CONDUCTIVITY ($\sigma_{Li}$) [S/cm] | | | GRAIN BOUNDARY RESISTANCE RATIO [%] |
|---|---|---|---|---|---|---|
| | | | PARTICLE BULK CONDUCTIVITY | GRAIN BOUNDARY CONDUCTIVITY | TOTAL ION CONDUCTIVITY | |
| EXAMPLE 1 | 52.9 | UNDETECTED | $1.9 \times 10^{-4}$ | $2.2 \times 10^{-4}$ | $1.0 \times 10^{-4}$ | 45 |
| EXAMPLE 2 | 52.7 | UNDETECTED | $1.9 \times 10^{-4}$ | $2.1 \times 10^{-4}$ | $1.0 \times 10^{-4}$ | 48 |
| EXAMPLE 3 | 53.3 | UNDETECTED | $1.9 \times 10^{-4}$ | $2.2 \times 10^{-4}$ | $1.0 \times 10^{-4}$ | 46 |
| EXAMPLE 4 | 53.0 | UNDETECTED | $1.9 \times 10^{-4}$ | $2.1 \times 10^{-4}$ | $1.0 \times 10^{-4}$ | 48 |
| EXAMPLE 5 | 54.0 | UNDETECTED | $1.9 \times 10^{-4}$ | $2.2 \times 10^{-4}$ | $1.0 \times 10^{-4}$ | 46 |
| EXAMPLE 6 | 52.8 | UNDETECTED | $2.0 \times 10^{-4}$ | $2.2 \times 10^{-4}$ | $1.1 \times 10^{-4}$ | 48 |
| COMPARATIVE EXAMPLE 1 | 52.5 | DETECTED | $1.5 \times 10^{-4}$ | $2.0 \times 10^{-5}$ | $1.8 \times 10^{-5}$ | 88 |
| COMPARATIVE EXAMPLE 2 | 52.7 | DETECTED | $1.6 \times 10^{-4}$ | $2.0 \times 10^{-5}$ | $1.8 \times 10^{-5}$ | 89 |
| COMPARATIVE EXAMPLE 3 | 52.2 | UNDETECTED | $1.6 \times 10^{-4}$ | $1.9 \times 10^{-5}$ | $1.7 \times 10^{-5}$ | 89 |
| COMPARATIVE EXAMPLE 4 | 51.9 | DETECTED | $1.2 \times 10^{-4}$ | $2.0 \times 10^{-5}$ | $1.7 \times 10^{-5}$ | 86 |

FIG. 5

| | FORMULA (1) | | LITHIUM ION CONDUCTIVITY ($\sigma_{Li}$) [S/cm] | | | GRAIN BOUNDARY RESISTANCE RATIO [%] |
|---|---|---|---|---|---|---|
| | x | y | PARTICLE BULK CONDUCTIVITY | GRAIN BOUNDARY CONDUCTIVITY | TOTAL ION CONDUCTIVITY | |
| EXAMPLE 7 | 0.10 | 0.01 | $8.5 \times 10^{-5}$ | $8.0 \times 10^{-5}$ | $4.1 \times 10^{-5}$ | 52 |
| EXAMPLE 8 | 1.00 | 0.10 | $7.7 \times 10^{-5}$ | $7.9 \times 10^{-5}$ | $3.9 \times 10^{-5}$ | 49 |
| EXAMPLE 9 | 0.10 | 0.50 | $9.3 \times 10^{-5}$ | $8.4 \times 10^{-5}$ | $4.4 \times 10^{-5}$ | 53 |
| EXAMPLE 10 | 1.00 | 0.50 | $7.5 \times 10^{-5}$ | $7.6 \times 10^{-5}$ | $3.8 \times 10^{-5}$ | 50 |
| EXAMPLE 11 | 0.50 | 0.05 | $1.1 \times 10^{-4}$ | $9.0 \times 10^{-5}$ | $5.0 \times 10^{-5}$ | 55 |
| EXAMPLE 12 | 0.40 | 0.07 | $1.2 \times 10^{-4}$ | $9.3 \times 10^{-5}$ | $5.2 \times 10^{-5}$ | 56 |
| COMPARATIVE EXAMPLE 5 | 0.05 | 0.01 | $6.0 \times 10^{-5}$ | $5.5 \times 10^{-6}$ | $5.0 \times 10^{-6}$ | 92 |
| COMPARATIVE EXAMPLE 6 | 0.07 | 0.50 | $7.0 \times 10^{-5}$ | $5.4 \times 10^{-6}$ | $5.0 \times 10^{-6}$ | 93 |
| COMPARATIVE EXAMPLE 7 | 0.60 | 0.00 (NO Ca) | $7.3 \times 10^{-5}$ | $4.0 \times 10^{-6}$ | $3.8 \times 10^{-6}$ | 95 |
| COMPARATIVE EXAMPLE 8 | 0.50 | 0.70 | $1.2 \times 10^{-4}$ | $6.0 \times 10^{-6}$ | $5.7 \times 10^{-6}$ | 95 |

FIG. 11

ELECTROLYTE AND BATTERY, AND ELECTRONIC DEVICE AND VEHICLE

BACKGROUND

1. Technical Field

The present invention relates to an electrolyte and a battery, and to an electronic device and a vehicle.

2. Related Art

All-solid batteries that use a solid electrolyte as a replacement for the traditional electrolyte organic electrolytic solution are known. For example, JP-A-2009-215130 proposes a lithium battery in which a solid electrolyte layer using lithium salt-containing electrolyte particles is used to mediate conduction of lithium ions between a positive electrode layer and a negative electrode layer.

In JP-A-2009-215130, electrolyte particles are fused to one another by being fired at a high temperature of 1,000° C. after compression molding. Because firing at such a high temperature of 1,000° C. tends to cause a composition change as the lithium is abstracted from the electrolyte particles, it would be desirable if electrolyte particles could be fired at temperatures below 1,000° C. To this end, for example, JP-A-2015-41573 proposes a garnet-type ion conductive oxide as a solid electrolyte that can be fired at low temperature. The solid electrolyte is a lithium lanthanum zirconate having a garnet-type crystalline structure with the zirconium site, the lanthanum site, and the lithium site substituted with niobium, calcium, and aluminum, respectively, at the same time.

However, with the low-temperature firing of the garnet-type ion conductive oxide described in JP-A-2015-41573, sintering is insufficient at the interface between crystal grains, and it is not possible to sufficiently reduce grain boundary resistance, and improve lithium ion conductivity (total ion conductivity).

SUMMARY

An advantage of some aspects of the invention is to solve at least a part of the problems described above, and the invention can be implemented as the following forms or application examples.

Application Example

An electrolyte according to this application example is an electrolyte represented by the following formula (1).

$$(Li_{7-3x+y}Ga_x)(La_{3-y}Ca_y)Zr_2O_{12} \quad (1)$$

wherein $0.1 \leq x \leq 1$, and $0.01 \leq y \leq 0.5$.

According to this application example, the electrolyte can have reduced grain boundary resistance, and improved lithium ion conductivity. Specifically, substituting the lithium site with gallium in lithium lanthanum zirconate tends to produce coarse particles. Increased numbers of coarse particles make the contact area between particles smaller, and lead to poor lithium ion conductivity (total ion conductivity). Such generation of coarse particles can be reduced, and the particle size can be made smaller by further substituting the lanthanum site with calcium. With a smaller particle size of electrolyte, the contact area between particles increases upon forming an electrolyte layer from the electrolyte by compression molding. These small electrolyte particles become densely packed to form the electrolyte layer, and reduce the grain boundary resistance. Specifically, an electrolyte having reduced grain boundary resistance, and improved lithium ion conductivity can be provided when the electrolyte is a lithium composite oxide containing gallium substituting the lithium site, and calcium substituting the lanthanum site.

It is preferable that, in the electrolyte according to the foregoing application example, $0.3 \leq x \leq 0.7$, and $0.04 \leq y \leq 0.08$ in the formula (1) are satisfied.

With this configuration, the lithium ion conductivity inside the particle bulk of the electrolyte can improve even when a low-purity lithium compound is used as a raw material.

Application Example

A battery according to this application example includes: a first collector electrode; a complex; and an electrolyte provided between the first collector electrode and the complex, and represented by $(Li_{7-3x+y}Ga_x)(La_{3-y}Ca_y)Zr_2O_{12}$, wherein $0.1 \leq x \leq 1$, and $0.01 \leq y \leq 0.5$.

According to this application example, a battery having reduced grain boundary resistance, and improved lithium ion conductivity can be provided. With the electrolyte, shorting between the complex and the first collector electrode can be reduced.

It is preferable that, in the battery according to the application example, the complex includes a positive electrode active material.

With this configuration, movement of charge is allowed between the positive electrode active material and the electrolyte, and the battery can desirably exhibit its function.

It is preferable that, in the battery according to the application example, the complex includes the electrolyte.

With the complex containing the positive electrode active material and the electrolyte, the lithium ion conductivity improves, and it becomes easier to increase battery capacity.

It is preferable that, in the battery according to the application example, the complex is provided between the electrolyte and a second collector electrode.

With this configuration, with the complex containing the positive electrode active material and the electrolyte, the lithium ion conductivity can further improve, and it becomes easier to increase battery capacity, making it possible to provide a battery of desirable battery characteristics.

It is preferable that, in the battery according to the application example, the positive electrode active material constitutes a porous body.

With this configuration, with the positive electrode active material constituting a porous body, the surface area can be increased.

It is preferable that, in the battery according to the application example, the electrolyte is provided inside a pore of the porous body.

With this configuration, the contact area between the positive electrode active material and the electrolyte increases more than when the electrolyte is not provided inside the pore of the porous body, and the interfacial resistance between the positive electrode active material and the electrolyte can be reduced. This makes it possible to provide desirable movement of charge at the interface between the positive electrode active material and the electrolyte.

It is preferable that, the battery according to the application example includes a negative electrode active material between the electrolyte and the first collector electrode.

With this configuration, the complex can be formed also on the negative electrode side, and transfer of lithium ions occurs between the negative electrode active material and the electrolyte. The complex can thus desirably exhibit its function, and the output and the capacity of the battery can improve.

Application Example

An electronic device according to this application example includes the battery of the foregoing application example.

According to this application example, an electronic device can be provided that includes the small, high-quality battery as a power supply.

Application Example

A vehicle according to this application example includes the battery of the foregoing application example.

According to this application example, a vehicle can be provided that includes the small, high-quality battery as a power supply.

BRIEF DESCRIPTION OF THE DRAWINGS

The invention will be described with reference to the accompanying drawings, wherein like numbers reference like elements.

FIG. 4 is a table showing the compositions of solid electrolytes according to Examples and Comparative Examples.

FIG. 5 is a table representing the lithium ion conductivity, and other evaluation results for Examples and Comparative Examples.

FIG. 11 is a table showing the compositions of the solid electrolytes according to Examples and Comparative Examples, and the evaluation results, including the results for lithium ion conductivity.

DESCRIPTION OF EXEMPLARY EMBODIMENTS

Figure 1:
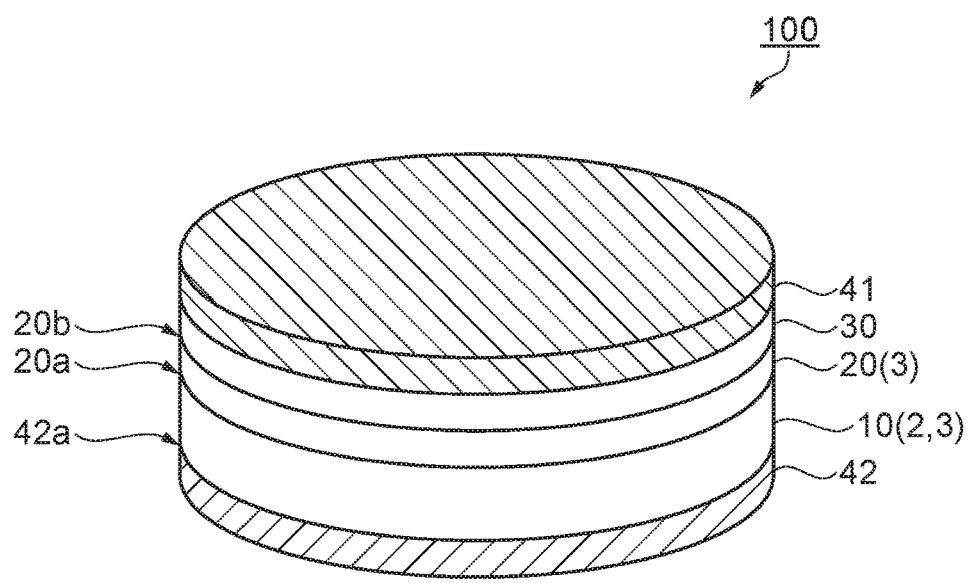
FIG. 1 is a schematic perspective view representing a configuration of a lithium battery as a battery according to First Embodiment.

Embodiments of the invention are described below with reference to the accompanying drawings. It is to be noted that, in the drawings below, the layers and various members described are not true to scale, and are shown in sizes that make the components recognizable.

First Embodiment

Battery

A battery according to the present embodiment is described below with reference to FIG. 1. The following descriptions of the battery of the present embodiment are given through the case of a lithium battery. FIG. 1 is a schematic perspective view representing a configuration of a lithium battery as a battery according to First Embodiment.

As illustrated in FIG. 1, a lithium battery 100 of the present embodiment includes a first collector electrode 41, a complex 10, and a solid electrolyte 3 provided between the first collector electrode 41 and the complex 10. The complex 10 is provided on the first surface 20a side of a solid electrolyte layer 20, whereas the first collector electrode 41 is provided on the second surface 20b side of the solid electrolyte layer 20. A negative electrode layer 30 is provided between the second surface 20b and the first collector electrode 41. The negative electrode layer 30 contains a negative electrode active material. The solid electrolyte layer 20 contains the solid electrolyte 3, and does not contain a positive electrode active material 2b or a negative electrode active material to be described later. As used herein, "layer" means an active material, an electrolyte, or any other substance of a form having a certain thickness.

The lithium battery 100 contains a second collector electrode 42. The complex 10 includes the positive electrode active material 2b and the solid electrolyte 3, and is provided between the solid electrolyte layer 20 and the second collector electrode 42. In other words, one of the surfaces of the complex 10 is in contact with the solid electrolyte layer 20 (first surface 20a), and the other surface opposite the first surface 20a is in contact with the surface 42a of the second collector electrode 42. Specifically, in the lithium battery 100, layers including the negative electrode layer 30, the solid electrolyte layer 20, and the complex 10 are sandwiched between a pair of collector electrodes, specifically, the first collector electrode 41 and the second collector electrode 42. The complex 10 functions as a positive electrode.

The complex 10 has a porous body 2 containing the positive electrode active material 2b. Specifically, the positive electrode active material 2b constitutes the porous body 2. The solid electrolyte 3 is provided also inside the pores of the porous body 2. That is, the complex 10 is formed as the porous body 2 is compounded in contact with the solid electrolyte 3 also inside the pores.

The solid electrolyte layer 20 is provided between the complex 10 and the negative electrode layer 30, and functions to mediate conduction of lithium ions while maintaining electrical insulation between the electrodes. As described above, the solid electrolyte layer 20 contains the solid electrolyte 3, as does the complex 10. A lithium composite oxide represented by the following formula (1) is used as the solid electrolyte 3 contained in the solid electrolyte layer 20 and in the complex 10.

$$(Li_{7-3x+y}Ga_x)(La_{3-y}Ca_y)Zr_2O_{12} \qquad (1),$$

wherein $0.1 \leq x \leq 1$, and $0.01 \leq y \leq 0.5$.

In formula (1), it is more preferable to satisfy $0.3 \leq x \leq 0.7$, and $0.04 \leq y \leq 0.08$. In this way, the solid electrolyte 3 can have improved lithium ion conductivity inside the particle bulk of the solid electrolyte 3 (particle bulk conductivity), even when a low-purity lithium compound is used as a raw material, and fired at a relatively low temperature of less than 1,000° C. in the solid electrolyte particle producing process to be described later. Specifically, the solid electrolyte layer 20 and the complex 10 can have desirable ion conductivity with the solid electrolyte 3 of the foregoing composition. Here, "low-purity" means that, for example, the lithium compound contained has a purity of less than 99.9 mass % as measured by a method such as ion chromatography quantitative analysis.

The solid electrolyte layer 20 may have a thickness in a range of preferably, for example, about 50 nm to about 100 µm. However, the solid electrolyte layer 20 may have any desired thickness as may be decided according to the material characteristics, and design. The second surface 20b may have an irregular structure, for example, such as a trench, a grating, and a pillar, as required, using a combination of different molding methods and working methods. The solid electrolyte layer 20 is not limited to a single layer, and may have a multilayer structure with, for example, a glass electrolyte layer formed on a crystalline layer to prevent shorting.

Any material may preferably be used for the first collector electrode 41 and the second collector electrode 42, provided that it does not cause an electrochemical reaction between the complex 10 and the solid electrolyte layer 20, and has electron conductivity. Examples of the materials of the first collector electrode 41 and the second collector electrode 42 include any of metals (simple metals) selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd); alloys containing at least one metallic element selected from the group above; conductive metal oxides such as ITO (Tin-doped Indium Oxide), ATO (Antimony-doped Tin Oxide), and FTO (Fluorine-doped Tin Oxide); and metal nitrides such as TiN (titanium nitride), ZrN (zirconium nitride), and TaN (tantalum nitride).

The first collector electrode 41 and the second collector electrode 42 may have forms that may be appropriately selected according to the intended purpose. Examples include a thin film formed of the materials having electron conductivity exemplified above, a metal foil, a plate shape, and a paste prepared by kneading a conductive fine powder with a bond. The first collector electrode 41 and the second collector electrode 42 may be formed after forming the laminate of the complex 10 and the solid electrolyte layer 20, or before forming the laminate.

Examples of the negative electrode active material contained in (or forming) the negative electrode layer 30 include a silicon-manganese alloy (Si—Mn), a silicon-cobalt alloy (Si—Co), a silicon-nickel alloy (Si—Ni), niobium pentoxide ($Nb_2O_5$), titanium oxide ($TiO_2$), indium oxide ($In_2O_3$), zinc oxide (ZnO), tin oxide ($SnO_2$), nickel oxide (NiO), tin (Sn)-doped indium oxide (ITO), aluminum (Al)-doped zinc oxide (AZO), gallium (Ga)-doped zinc oxide (GZO), antimony (Sb)-doped tin oxide (ATO), fluorine (F)-doped tin oxide (FTO), carbon materials, substances with lithium ions inserted between layers of carbon material, an anatase phase of $TiO_2$, lithium composite oxides such as $Li_4Ti_5O_{12}$, and $Li_2Ti_3O_7$, and lithium (Li) metal.

The negative electrode layer 30 has a thickness of preferably, for example, about 50 nm to about 100 µm. It is, however, possible to freely design the negative electrode layer 30 according to the desired battery capacity, and the material characteristics.

The lithium battery 100 is, for example, circular disc-like in shape with an outer size measuring about 10 mm in diameter, and about 200 µm in thickness. Aside from being small and thin, the lithium battery 100 is chargeable and dischargeable, and can produce a high output energy, making the battery preferred for use as a power supply for devices such as a portable information terminal. The shape of the lithium battery 100 is not limited to a circular disc, and may be, for example, a polygonal disc. The thin lithium battery 100 may be used by itself, or may be used as a laminate of a plurality of lithium batteries 100. When laminated, the lithium batteries 100 are not necessarily required to have the configuration with a pair of collector electrodes, specifically the first collector electrode 41 and the second collector electrode 42, and only one of the collector electrodes may be provided.

Complex

Figure 2:
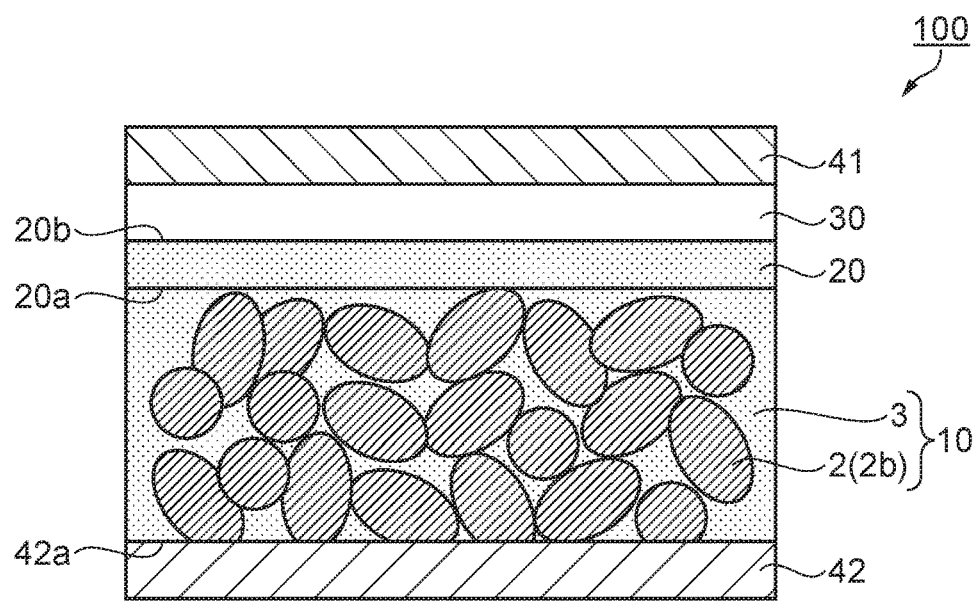
FIG. 2 is a schematic cross sectional view showing the configuration of the lithium battery.

The configuration of the complex 10 included in the lithium battery 100 is described below with reference to FIG. 2. FIG. 2 is a schematic cross sectional view showing the configuration of the lithium battery.

As described above, the complex 10 is provided between the solid electrolyte layer 20 and the second collector electrode 42. The first collector electrode 41 is provided on the second surface 20b of the solid electrolyte layer 20 (the surface opposite the first surface 20a that is in contact with the complex 10), via the negative electrode layer 30.

The complex 10 has the porous body 2 containing the positive electrode active material 2b, as described above. The porous body 2 is an assembly of the particulate positive electrode active material 2b. The porous body 2 has a plurality of pores. The pores are in communication with one another in a mesh-like fashion inside the porous body 2. The solid electrolyte 3 is provided so as to fill the pores. Specifically, the complex 10 is formed as the surface of the porous body 2, including the pores, is compounded in contact with the solid electrolyte 3. This increases the contact area between the porous body 2 and the solid electrolyte 3 as compared to when the porous body 2 is not porous, or when the solid electrolyte 3 is not provided inside the pores. The increased contact area reduces the interfacial resistance, and enables desirable charge movement at the interface between the porous body 2 and the solid electrolyte 3. FIG. 2 schematically shows the positive electrode active material 2b, and is not true to the actual particle diameter or size.

When the second collector electrode 42 is used on the positive electrode side as in the lithium battery 100 of the present embodiment, a commonly known lithium composite metal compound may be used as the material (positive electrode active material 2b) of the porous body 2.

The lithium composite metal compound refers to compounds, such as oxides, containing lithium and two or more metallic elements as a whole, and in which the presence of oxoacid ions cannot be recognized.

Examples of the lithium composite metal compounds include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, $Li_2MnSiO_4$, NMC ($Li_a(Ni_xMn_yCo_{1-x-y})O_2$), and NCA ($Li(Ni_xCo_yAl_{1-x-y})O_2$). In the present embodiment, the lithium composite metal compounds encompass solid solutions of lithium composite metal compounds in which some of the atoms in the crystals are substituted with other transition metals, main-group metals, alkali metals, alkali rare earths, lanthanoids, chalcogenides, halogens, or the like, and such solid solutions also may be used as the positive electrode active material.

By using the lithium composite metal compound as the positive electrode active material 2b forming the porous body 2, transfer of electrons occurs between particles of the positive electrode active material 2b, and transfer of lithium ions occurs between the positive electrode active material 2b and the solid electrolyte 3. In this way, the porous body 2 (complex 10) can desirably exhibit its function.

The porous body 2 has a bulk density of preferably 50% to 90%, more preferably 50% to 80%. With the porous body 2 having a bulk density in these ranges, the surface area inside the pores of the porous body 2 increases, and the porous body 2 and the solid electrolyte 3 can have a wider contact area. This makes it easier to increase the capacity of the lithium battery 100 using the complex 10.

The following mathematical formula (A) is established when the bulk density is β (%), the apparent volume of the porous body 2 including the pores is v, the mass of the porous body 2 is w, and the particle density of the positive electrode active material 2b is ρ. The bulk density can be determined using this formula.

$$\beta = \{w/(v \cdot \rho)\} \times 100 \tag{A}$$

In order to provide the foregoing range of bulk density for the porous body 2, it is preferable that the positive electrode active material 2b have an average particle size of 0.3 μm to 10 μm, more preferably 0.5 μm to 5 μm. The average particle size of the positive electrode active material 2b can be measured by, for example, dispersing the positive electrode active material 2b in n-octanol in a concentration of 0.1 mass % to 10 mass %, and determining the median size with a Nanotrac UPA-EX250, a light scattering particle size distribution measurement device available from Nikkiso.

The bulk density of the porous body 2 also can be controlled by using a pore-forming material in the process of forming the porous body 2.

The solid electrolyte 3 may contain other solid electrolytes, in addition to the solid electrolyte of formula (1). Examples of other solid electrolytes include oxides, sulfides, halides, nitrides, and hydrides such as $SiO_2$—$P_2O_5$—$Li_2O$, $SiO_2$—$P_2O_5$—LiCl, $Li_2O$—LiCl—$B_2O_3$, $Li_{3.4}V_{0.6}Si_{0.4}O_4$, $Li_{14}ZnGe_4O_{16}$, $Li_{3.6}V_{0.4}Ge_{0.6}O_4$, $Li_{1.3}Ti_{1.7}Al_{0.3}(PO_4)_3$, $Li_{2.88}PO_{3.73}N_{0.14}$, $LiNbO_3$, $Li_{0.35}La_{0.55}TiO_3$, $Li_7La_3Zr_2O_{12}$, $Li_{6.75}La_3Zr_{1.75}Nb_{0.25}O_{12}$, $Li_2S$—$SiS_2$, $Li_2S$—$SiS_2$—LiI, $Li_2S$—$SiS_2$—$P_2S_5$, LiPON, LiI, LiI—$CaI_2$, LiI—CaO, $LiAlCl_4$, $LiAlF_4$, LiI—$Al_2O_3$, LiF—$Al_2O_3$, LiBr—$Al_2O_3$, $Li_2O$—$TiO_2$, $La_2O_3$—$Li_2O$—$TiO_2$, $Li_3N$, $Li_3NI_2$, $Li_3N$—LiI—LiOH, $Li_3N$—LiCl, $Li_6NBr_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $LiSiO_4$—$Li_4ZrO_4$, $LiBH_4$, $Li_{7-x}PS_{6-x}Cl_x$, $Li_{10}GeP_2S_{12}$, $Li_2CO_3$, $Li_3BO_3$, and $Li_{2+x}C_{1-x}B_xO_3$, and crystalline, amorphous, and partially crystallized glass of partly substituted materials of these oxides, sulfides, halides, nitrides, and hydrides. It is also possible to use solid solutions of these compounds in which some of the atoms are substituted with transition metals, main-group metals, alkali metals, alkali rare earths, lanthanoids, chalcogenides, halogens, or the like.

Preferred as other solid electrolytes that may be contained in the solid electrolyte 3 are lithium composite metal compounds containing lanthanum and zirconium represented by the following formula (2).

$$Li_{7-x}La_3(Zr_{2-x},M_x)O_{12} \tag{2}$$

wherein M represents at least one of Nb, Sc, Ti, V, Y, Hf, Ta, Al, Si, Ga, Ge, Sn, and Sb, and x is a real number of 0 or more and less than 2.

Preferred as M in the formula (2) is at least one of niobium (Nb), tantalum (Ta), and antimony (Sb). Examples of such solid electrolytes include $Li_{6.75}La_3(Zr_{1.75},Nb_{0.25})O_{12}$. The lithium ion conductivity of the solid electrolyte 3 can be further improved by containing such other solid electrolytes.

The total ion conductivity as an index of the lithium ion conductivity of the solid electrolyte 3 in the complex 10 is preferably $3.5 \times 10^{-5}$ S/cm or more. With the solid electrolyte 3 having such an ion conductivity, the ions contained in the solid electrolyte 3 in locations distance away from the surface of the porous body 2 can more easily reach the surface of the porous body 2. These ions can contribute to the battery reaction in the porous body 2, and the lithium battery 100 can have an even larger capacity.

Here, the ion conductivity of the solid electrolyte 3 means the total ion conductivity as the sum of the particle bulk conductivity, or the conductivity of the solid electrolyte 3 itself, and the grain boundary conductivity, or the conductivity between crystal particles when the solid electrolyte 3 is crystalline. The grain boundary conductivity is an index of the grain boundary resistance of the solid electrolyte 3, and the grain boundary resistance decreases as the grain boundary conductivity increases. The method used to measure the ion conductivity of the solid electrolyte 3 will be described later.

In the lithium battery 100, the upper side of the complex 10 is in contact with the first surface 20a of the solid electrolyte layer 20 when the upper side is a direction away from the second collector electrode 42 along the direction of a normal line (upward in FIG. 2). The lower side of the complex 10 is in contact with the surface 42a of the second collector electrode 42. In the complex 10, the upper surface in contact with the first surface 20a represents one surface of the complex 10, and the lower surface in contact with the second collector electrode 42 (surface 42a) represents the other surface of the complex 10.

The upper surface of the complex 10 is in contact with the solid electrolyte layer 20. In other words, the solid electrolyte layer 20 is interposed between the complex 10 and the first collector electrode 41 (see FIG. 1). In this way, the porous body 2 and the first collector electrode 41 will not be electrically connected to each other, and shorting can be prevented. Because the complex 10 and the solid electrolyte layer 20 both contain the solid electrolyte 3, the solid electrolyte 3 can be formed at the same time for the complex 10 and the solid electrolyte layer 20. Specifically, the porous body 2 and the solid electrolyte layer 20 may be formed at once in the production of the lithium battery 100.

The porous body 2 is exposed on the lower surface of the complex 10. Accordingly, the porous body 2 and the second collector electrode 42 (surface 42a) are in contact with each other, and are electrically connected to each other.

Other components of the complex 10, such as a binder for binding the positive electrode active material 2b, and a conductive auxiliary agent for providing conductivity for the porous body 2, should preferably be contained in as small an amount as possible. Particularly, any remaining binder in the complex 10 may have adverse effects on electrical characteristics, and the binder needs to be removed by careful heating in a later process. Specifically, in the present embodiment, the percentage mass reduction after heating the complex 10 at 400° C. for 30 minutes is 5 mass % or less. The percentage mass reduction is preferably 3 mass % or less, further preferably 1 mass % or less. Even more preferably, there is no observable mass reduction, or the reduction is within measurement errors. With such percentage mass reduction of the complex 10, it is possible to reduce the amounts of the solvent and the adsorbed water that evaporate under predetermined heating conditions, or the amount of organic material that vaporizes by being burned or oxidized. In this way, the lithium battery 100, with the complex 100, can have further improved electrical characteristics (charge and discharge characteristics).

The percentage mass reduction of the complex 10 can be determined from the values of the mass of the complex 10 before and after the heating performed under predetermined heating conditions using a simultaneous thermogravimetric-differential thermal analysis (TG-DTA) analyzer.

In the complex 10, the pores of the porous body 2 are in communication with one another inside the porous body 2 in a mesh-like fashion, and the solid portion of the porous body 2 also forms a mesh structure. For example, $LiCoO_2$, a positive electrode active material, is known to have anisotropy for crystal electron conductivity. Because of such properties, an electron conductivity drop may occur in a manner that depends on the direction of crystal electron conductivity in a configuration in which the pores extend in a specific direction as in the case where pores are formed by machining. In the present embodiment, on the other hand, the porous body 2 has a mesh structure, and an electrochemically active, continuous surface can be formed regardless of the electron conductivity of crystals, or the anisotropy in ion conductivity. This makes it possible to provide desirable electron conduction, regardless of the materials used.

The surface 42a of the second collector electrode 42 is in contact with the porous body 2 exposed on the lower surface of the complex 10. The solid electrolyte 3, provided on the porous body 2 and inside the pores, is in contact with the porous body 2 on surfaces other than the surface contacting the second collector electrode 42, including the pores inside the porous body 2. In the complex 10 of such a configuration, the contact area between the porous body 2 and the solid electrolyte 3 (second contact area) is larger than the contact area between the second collector electrode 42 and the porous body 2 (first contact area). In this way, the interface between the porous body 2 and the solid electrolyte 3 is unlikely to become a bottleneck of charge movement, and desirable charge movement can be ensured as the complex 10. This makes it possible to increase the capacity and the output of the lithium battery 100 using the complex 10.

Battery Producing Method

Figure 3:
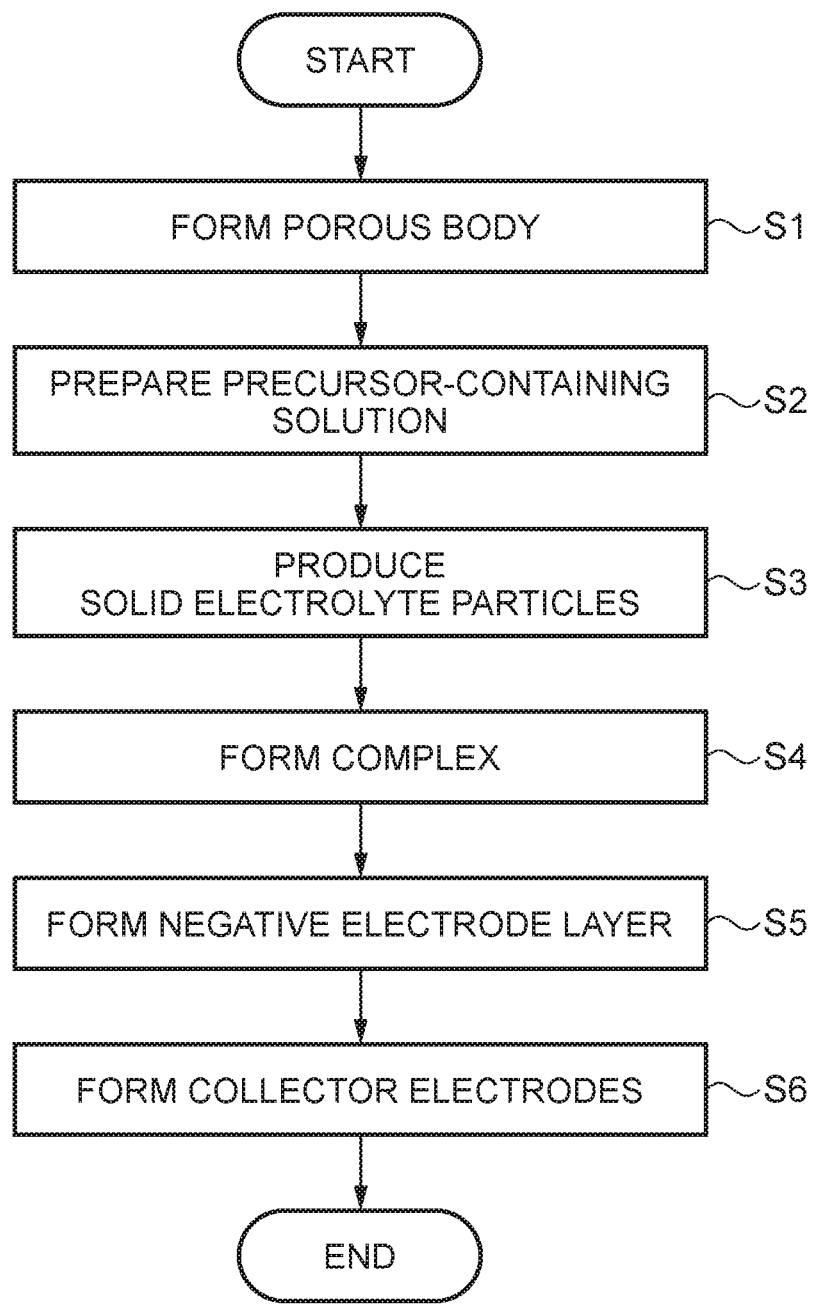
FIG. 3 is a procedural diagram representing a method for producing the lithium battery.

A method for producing the lithium battery 100 as a battery according to the present embodiment is described below with reference to FIG. 3. FIG. 3 is a procedural diagram representing a method for producing the lithium battery. The procedures shown in FIG. 3 are merely an example, and the invention is not limited to this.

The method for producing the lithium battery 100 of the present embodiment includes molding the porous body 2 (step S1), preparing a solution containing a precursor of the solid electrolyte 3 (step S2), heating the solution to produce solid electrolyte particles (step S3), contacting a melt of the solid electrolyte particles to the porous body 2 to form the solid electrolyte 3 inside the pores of the porous body 2, and cooling the porous body 2 to compound the porous body 2 and the solid electrolyte 3, and form the complex 10 and the solid electrolyte layer 20 (step S4), forming the negative electrode layer 30 (step S5), and forming the first collector electrode 41 and the second collector electrode 42 (step S6).

Molding of Porous Body 2

The porous body 2 is molded in step S1 of FIG. 3. In the present embodiment, a lithium composite metal compound $LiCoO_2$ is used as the material (positive electrode active material 2b) of the porous body 2. First, particles of $LiCoO_2$ (Sigma-Aldrich) are classified in n-butanol using a wet centrifuge LC-1000 (Krettek) to obtain a positive electrode active material 2b having an average particle size of 5 μm. The positive electrode active material 2b is then compression molded using a mold. The $LiCoO_2$ is pressurized in a mold (a dice equipped with an evacuation port having an inner diameter of 10 mm) for 2 minutes under a pressure of 624 MPa to produce a circular disc-shaped molded product of $LiCoO_2$ (positive electrode active material 2b) having a diameter of 10 mm, an effective diameter of 8 mm, and a thickness of 150 μm.

The molded product of the positive electrode active material 2b is mounted on a substrate, and subjected to a heat treatment at 900° C. for 8 hours to obtain the porous body 2. The heat treatment sinters the particles of the positive electrode active material 2b, and helps maintain the shape of the molded product. The positive electrode active material 2b contacts and binds to each other, and forms a pathway for electron movement. The substrate material is not particularly limited, and is preferably a material that does not easily react with the positive electrode active material 2b or with the solid electrolyte 3.

Preferably, the heat treatment temperature is, for example, a temperature of 850° C. or more, and less than the melting point of the positive electrode active material 2b. In this way, the positive electrode active material 2b can sinter, and form a integrated porous body. With a heat treatment temperature of 850° C. or more, sintering sufficiently proceeds, and electron conductivity is ensured in the crystals of the positive electrode active material 2b. By making the heat treatment temperature less than the melting point of the positive electrode active material 2b, excess evaporation of lithium ions inside the crystals of the positive electrode active material 2b can be reduced, and the lithium ion conductivity can be maintained. This ensures that the complex 10 has an electrical capacity. The heat treatment temperature is more preferably 875° C. to 1,000° C. In this way, the lithium battery 100 using the complex 10 can have an appropriate output and capacity.

The heat treatment time is preferably, for example, 5 minutes to 36 hours, more preferably 4 hours to 14 hours. The porous body 2 having a plurality of pores is obtained after these processes.

Preparation of Solution Containing Precursor

In step S2, a solution containing a precursor of the solid electrolyte 3 is prepared. The precursor of the solid electrolyte 3 may be at least one of the following (A), (B), (C), and (D). The precursor (B) is a precursor of when forming the solid electrolyte 3 using a sol-gel method. The precursor (D) is used in the present embodiment.

(A) A composition including a metal salt that contains the metal atoms of the solid electrolyte 3 in proportions according to the composition formula of the solid electrolyte 3, and that becomes oxidized to produce the solid electrolyte 3.

(B) A composition including a metal alkoxide compound that contains the metal atoms of the solid electrolyte 3 in proportions according to the composition formula of the solid electrolyte 3.

(C) A dispersion in which fine particles of the solid electrolyte 3, or a fine particulate sol containing the metal atoms of the solid electrolyte 3 in proportions according to the composition formula of the solid electrolyte 3 are dispersed in a solvent.

(D) A composition including a metal salt and a metal alkoxide compound that contain the metal atoms of the solid electrolyte 3 in proportions according to the composition formula of the solid electrolyte 3, and that become oxidized to produce the solid electrolyte 3.

A lithium compound, a lanthanum compound, a zirconium compound, a gallium compound, and a calcium compound are used as materials of the precursor of the solid electrolyte 3 of the present embodiment. These compounds are not particularly limited, and are preferably at least one of metal salts or metal alkoxides of lithium, lanthanum, zirconium, gallium, and calcium.

Examples of such lithium compounds include lithium metal salts such as lithium chloride, lithium nitride, lithium acetate, lithium hydroxide, and lithium carbonate; and lithium alkoxides such as lithium methoxide, lithium ethoxide, lithium propoxide, lithium isopropoxide, lithium n-butoxide, lithium isobutoxide, lithium secondary butoxide, lithium tert-butoxide, and lithium dipivaloylmethanate. At least one selected from this group may be used.

Examples of the lanthanum compounds include lanthanum metal salts such as lanthanum chloride, lanthanum nitride, and lanthanum acetate; and lanthanum alkoxides such as lanthanum trimethoxide, lanthanum triethoxide, lanthanum tripropoxide, lanthanum triisopropoxide, lanthanum tri-n-butoxide, lanthanum triisobutoxide, lanthanum tri-secondary butoxide, lanthanum tri-tert-butoxide, and tris(dipivaloylmethanate)lanthanum. At least one selected from this group may be used.

Examples of the zirconium compounds include zirconium metal salts such as zirconium chloride, zirconium oxychloride, zirconium oxynitride, zirconium oxyacetate, and zirconium acetate; and zirconium alkoxides such as zirconium tetramethoxide, zirconium tetraethoxide, zirconium tetrapropoxide, zirconium tetraisopropoxide, zirconium tetra-n-butoxide, zirconium tetraisobutoxide, zirconium tetra-secondary butoxide, zirconium tetra-tert-butoxide, and tetrakis(dipivaloylmethanate) zirconium. At least one selected from this group may be used.

Examples of the gallium compounds include gallium metal salts such as gallium bromide, gallium chloride, gallium iodide, and gallium nitride; and gallium alkoxides such as gallium trimethoxide, gallium triethoxide, gallium tri-n-propoxide, gallium triisopropoxide, and gallium tri-n-butoxide. At least one selected from this group may be used.

Examples of the calcium compounds include calcium metal salts such as calcium bromide, calcium chloride, calcium fluoride, calcium iodide, calcium nitride, calcium oxalate, and calcium acetate; and calcium alkoxides such as calcium dimethoxide, calcium diethoxide, calcium diisopropoxide, calcium di-n-propoxide, calcium diisobutoxide, calcium di-n-butoxide, and calcium di-secondary butoxide. At least one selected from this group may be used.

The solvent of the solution containing the precursor of the solid electrolyte 3 is water, or a single or mixed organic solvent capable of dissolving the metal salts or the metal alkoxides above. Non-limiting examples of the organic solvent include alcohols such as methyl alcohol, ethyl alcohol, n-propyl alcohol, isopropyl alcohol, n-butyl alcohol, allyl alcohol, and an ethylene glycol monobutyl ether (2-n-butoxyethanol); glycols such as ethylene glycol, propylene glycol, butylene glycol, hexylene glycol, pentanediol, hexanediol, heptanediol, and dipropylene glycol; ketones such as dimethyl ketone, methyl ethyl ketone, methyl propyl ketone, and methyl isobutyl ketone; esters such as methyl formate, ethyl formate, methyl acetate, and methyl acetoacetate; ethers such as a diethylene glycol monomethyl ether, a diethylene glycol monoethyl ether, a diethylene glycol dimethyl ether, an ethylene glycol monomethyl ether, an ethylene glycol monoethyl ether, and a dipropylene glycol monomethyl ether; organic acids such as formic acid, acetic acid, 2-ethylbutyric acid, and propionic acid; aromatic compounds such as toluene, o-xylene, and p-xylene; and amides such as formamide, N,N-dimethylformamide, N,N-diethylformamide, dimethylacetoamide, and N-methylpyrrolidone.

The metal salt or metal alkoxide is dissolved in the solvent to prepare a solution containing a precursor of the solid electrolyte 3. The solution contains lithium, lanthanum, zirconium, gallium, and calcium in proportions according to the composition formula of the solid electrolyte 3 (formula (1)). In the present embodiment, metallic compound solutions containing metal salts or metal alkoxides of lithium, lanthanum, zirconium, gallium, and calcium are separately produced, and these are mixed in proportions according to the composition formula of the solid electrolyte 3 to prepare a solution containing a precursor of the solid electrolyte 3.

Production of Solid Electrolyte Particles

In step S3, the solid electrolyte particles are produced from the solution containing a precursor of the solid electrolyte 3. The solution is heated and fired at 800° C. for 10 hours in dry air under applied pressure to produce a solid. The solid is pulverized and classified to obtain solid electrolyte particles having an average particle size of about 0.5 μm. A conductive auxiliary agent may be added to the solid electrolyte particles to provide conductivity. It is preferable not to add a binder. By not adding a binder, the complex 10 will not have a residue of organic materials derived from the binder, and properties such as ion conductivity improve. It is also possible to save manufacture time without the organic material removing procedure.

Formation of Complex

In step S4, a melt of the solid electrolyte particles is contacted to the porous body 2 to provide (form) the solid electrolyte 3 inside the pores of the porous body 2. First, the solid electrolyte particles are placed on the top surface (ceiling surface) of the porous body 2, and the solid electrolyte particles are heated. Preferably, heating is performed at a temperature of 800° C. to 1,000° C. for 1 to 240 minutes. Preferably, the solid electrolyte particles are heated in dry air.

By being heated to a temperature above its melting point, the solid electrolyte particles melt, and produce a melt. The melt encloses the whole porous body 2 as it permeates into the pores of the porous body from the top surface of the porous body 2. The solid electrolyte particles may be heated by laser annealing. Here, the solid electrolyte layer 20 can be formed simultaneously with the complex 10 by adjusting the amount of the solid electrolyte particles placed on the top surface of the porous body 2.

The method used to form the solid electrolyte 3 on the porous body 2 is not limited to the method that involves permeation of the melt of the solid electrolyte particles. The solid electrolyte 3 also may be formed by using a method that involves, for example, dipping, dropping, blowing, permeation by capillary action, or spin coating, using the solution containing a precursor of the solid electrolyte 3. A heat treatment may be performed in a later process to remove the solvent in the solution, and to fire the solid electrolyte 3. The solid electrolyte 3 may be formed by heat treatment after the solid electrolyte particles are provided inside the pores of the porous body 2.

Thereafter, the porous body 2 is allowed to cool, and compounded with the solid electrolyte 3 to form the complex 10 and the solid electrolyte layer 20. The complex 10 is then polished on the surface (other surface) opposite the surface (one surface) where the solid electrolyte layer 20 was formed. The polishing ensures that the porous body 2 is exposed, and provides an electrical connection with the surface 42a of the second collector electrode 42 formed in a later process (step S7). The polishing may be omitted when the porous body 2 is sufficiently exposed on the other surface of the complex 10 after the foregoing steps.

Formation of Negative Electrode Layer 30

In step S5, the negative electrode layer 30 is formed on the second surface 20b side of the solid electrolyte layer 20. The negative electrode layer 30 may be formed by using a solution process, such as a sol-gel method, and an organic metal pyrolysis method involving hydrolysis reaction of organometallic compounds. Other examples include a CVD (Chemical Vapor Deposition) method using a suitable metallic compound and a suitable gas atmosphere, an ALD (Atomic Layer Deposition) method, a green sheet method and a screen printing method using a slurry of the solid electrolyte particles, an aerosol deposition method, a sputtering method using a suitable target and a suitable gas atmosphere, a PLD (Pulsed Laser Deposition) method, a vacuum vapor deposition method, plating, and thermal spraying. The material forming the negative electrode layer 30 may be the negative electrode active material described above, and lithium (Li metal) is used in the present embodiment.

Formation of Collector Electrode

In step S6, the first collector electrode 41 and the second collector electrode 42 are formed. The first collector electrode 41 and the second collector electrode 42 may be formed by using a suitable method as may be selected according to the reactivity to the surface where these electrodes are to be formed, the electrical conductivity desired for the electrical circuit, and the electrical circuit design. Examples include a method that bonds the electrodes with a separately provided suitable adhesive layer, a gas-phase deposition method such as a PVD method, a CVD method, a PLD method, an ALD method, and an aerosol deposition method, and a wet method such as a sol-gel method, an organic metal pyrolysis method, and plating. The material forming the first collector electrode 41 and the second collector electrode 42 may be any of the materials described above. The lithium battery 100 is completed after these processes.

As described above, the solid electrolyte 3 and the lithium battery 100 according to the embodiment have the following effects.

Because the solid electrolyte of the formula (1) is used as the solid electrolyte 3, the grain boundary resistance can be reduced, and the lithium ion conductivity can improve. Specifically, because the lithium site and the lanthanum site of lithium lanthanum zirconate are substituted with gallium and calcium, respectively, coarse particles are less likely to occur, and the particle size of the solid electrolyte particles can be made smaller. Because of the small particle size, the contact area between the particles increases upon formation of the solid electrolyte 3. Further, because the solid electrolyte 3 is formed as these small particles become densely packed, the grain boundary resistance can be reduced. Accordingly, the solid electrolyte 3 can have improved lithium ion conductivity with reduced grain boundary resistance.

With the composition of the formula (1) satisfying $0.3 \leq x \leq 0.7$, and $0.04 \leq y \leq 0.08$, the lithium ion conductivity in the particle bulk of the solid electrolyte 3 (particle bulk conductivity) can improve even when a low-purity lithium compound is used as a raw material.

With the solid electrolyte 3, the lithium battery 100 can have improved lithium ion conductivity, and reduced grain boundary resistance. Further, the lithium ion conductivity improves because the complex 10 contains the positive electrode active material 2b and the solid electrolyte 3. This makes it easier to increase the battery capacity of the lithium battery 100. Further, because the complex 10 formed includes the solid electrolyte 3 provided also inside the pores of the porous body 2, the contact area between the porous body 2 and the solid electrolyte 3 increases, and the interfacial resistance between the porous body 2 and the solid electrolyte 3 becomes smaller. This provides desirable charge movement at the interface between the porous body 2 and the solid electrolyte 3.

The effects of the embodiment are described below in greater detail through Examples and Comparative Examples of the solid electrolyte of the embodiment. FIG. 4 is a table showing the compositions of the solid electrolytes according to Examples and Comparative Examples. In the experiment below, weights were measured in units of 0.1 mg, using an analytical balance ME204T (Mettler-Toledo Inc.).

Examples 1 to 6

Preparation of Metallic Compound Solution

Metallic compound solutions of a lithium compound, a lanthanum compound, a zirconium compound, a gallium compound, and a calcium compound were prepared using each compound with a solvent.

2-n-Butoxyethanol Solution A of 1 Mol/Kg Lithium Nitride

First, 1.3789 g of lithium nitride having a purity of 99.95% (Kanto Kagaku, 3N5), and 18.6211 g of 2-n-butoxyethanol (ethylene glycol monobutyl ether; Kanto Kagaku, Cica grade) were weighed into a 30-g Pyrex (trademark of Corning) reagent bottle containing a magnetic stirrer bar therein. The bottle was placed on a magnetic stirrer having a hot plate function, and the mixture was stirred at 190° C. for 1 hour to completely dissolve the lithium nitride in 2-n-butoxyethanol. The solution was then allowed to cool to room temperature (about 20° C.) to obtain a 2-n-butoxyethanol solution A of 1 mol/kg of lithium nitride. The lithium nitride purity can be measured using an ion chromatography mass spectrometer.

Ethyl Alcohol Solution of 1 Mol/Kg Gallium Nitride n-Hydrate

First, 3.5470 g of gallium nitride n-hydrate (n=5.5; Kojundo Chemical Laboratory Co., Ltd., 3N), and 6.4530 g of ethyl alcohol were weighed into a 20-g Pyrex reagent bottle containing a magnetic stirrer bar therein. The bottle was placed on a magnetic stirrer having a hot plate function, and the mixture was stirred at 90° C. for 1 hour to completely dissolve the gallium nitride n-hydrate (n=5.5) in ethyl alcohol. The solution was then allowed to cool to room temperature to obtain an ethyl alcohol solution of 1 mol/kg of gallium nitride n-hydrate (n=5.5). The hydration number n of the gallium nitride n-hydrate used was 5.5 due to a mass reduction by combustion experiment.

2-n-Butoxyethanol Solution of 1 Mol/Kg Lanthanum Nitride Hexahydrate

First, 8.6608 g of lanthanum nitride hexahydrate (Kanto Kagaku, 4N), and 11.3392 g of 2-n-butoxyethanol were weighed into a 30-g Pyrex reagent bottle containing a magnetic stirrer bar therein. The bottle was placed on a magnetic stirrer having a hot plate function, and the mixture was stirred at 140° C. for 30 minutes to completely dissolve the lanthanum nitride hexahydrate in 2-n-butoxyethanol. The solution was then allowed to cool to room temperature to obtain a 2-n-butoxyethanol solution of 1 mol/kg of lanthanum nitride hexahydrate.

2-n-Butoxyethanol Solution of 1 Mol/Kg Calcium Nitride Tetrahydrate

First, 2.3600 g of calcium nitride tetrahydrate (Kanto Kagaku, 3N), and 7.6400 g of 2-n-butoxyethanol were weighed into a 20-g Pyrex reagent bottle containing a magnetic stirrer bar therein. The bottle was placed on a magnetic stirrer having a hot plate function, and the mixture was stirred at 100° C. for 30 minutes to completely dissolve the calcium nitride tetrahydrate in 2-n-butoxyethanol. The solution was then allowed to cool to room temperature to obtain a 2-n-butoxyethanol solution of 1 mol/kg of calcium nitride tetrahydrate.

2-n-Butoxyethanol Solution of 1 Mol/Kg Zirconium Tetra-n-Butoxide

First, 3.8368 g of zirconium tetra-n-butoxide (Kanto Kagaku, GC: gas chromatography purity 87.5 mass %), and 6.1632 g of 2-n-butoxyethanol were weighed into a 20-g Pyrex reagent bottle containing a magnetic stirrer bar therein. The bottle was placed on a magnetic stirrer, and the mixture was stirred at room temperature for 30 minutes to completely dissolve the zirconium tetra-n-butoxide in 2-n-butoxyethanol, and obtain a 2-n-butoxyethanol solution of 1 mol/kg of zirconium tetra-n-butoxide. The remaining 12.5 mass % in the GC purity of the zirconium tetra-n-butoxide is n-butyl alcohol. The measured purity with an ion chromatography mass spectrometer was 3 N.

Preparation of Solution Containing Precursor of Solid Electrolyte

For Examples 1 to 6 and Comparative Examples 1 to 4, the metallic compound solutions were used to prepare solutions containing a precursor of a solid electrolyte of the formula $(Li_{7-3x+y}Ga_x)(La_{3-y}Ca_y)Zr_2O_{12}$ (formula 1), with the x and y values shown in FIG. 4.

Example 1: Solution Containing Precursor of $(Li_{6.71}Ga_{0.10})(La_{2.99}Ca_{0.01})Zr_2O_{12}$ In Example 1, a solution containing a precursor of a lithium composite oxide with x=0.10, and y=0.01 is prepared. The metallic compound solutions were used in weighed amounts of 8.0520 g for the 2-n-butoxyethanol solution A of 1 mol/kg of lithium nitride, 0.1000 g for the ethyl alcohol solution of 1 mol/kg of gallium nitride n-hydrate (n=5.5; Kojundo Chemical Laboratory Co., Ltd., 3N), 2.9900 g for the 2-n-butoxyethanol solution of 1 mol/kg of lanthanum nitride hexahydrate, 0.0100 g for the 2-n-butoxyethanol solution of 1 mol/kg of calcium nitride tetrahydrate, and 2.2857 g for the 2-n-butoxyethanol solution of 1 mol/kg of zirconium tetra-n-butoxide. After dropping a magnetic stirrer bar, the mixture was stirred at room temperature for 30 minutes using a magnetic stirrer, and a precursor-containing solution of Example 1 was obtained.

Example 2: Solution Containing Precursor of $(Li_{4.10}Ga_{1.00})(La_{2.90}Ca_{0.10})Zr_2O_{12}$ In Example 2, a solution containing a precursor of a lithium composite oxide with x=1.00, and y=0.10 is prepared. The metallic compound solutions were used in weighed amounts of 4.9200 g for the 2-n-butoxyethanol solution A of 1 mol/kg of lithium nitride, 1.0000 g for the ethyl alcohol solution of 1 mol/kg of gallium nitride n-hydrate (n=5.5; Kojundo Chemical Laboratory Co., Ltd., 3N), 2.9000 g for the 2-n-butoxyethanol solution of 1 mol/kg of lanthanum nitride hexahydrate, 0.1000 g for the 2-n-butoxyethanol solution of 1 mol/kg of calcium nitride tetrahydrate, and 2.2857 g for the 2-n-butoxyethanol solution of 1 mol/kg of zirconium tetra-n-butoxide. After dropping a magnetic stirrer bar, the mixture was stirred at room temperature for 30 minutes using a magnetic stirrer, and a precursor-containing solution of Example 2 was obtained.

Example 3: Solution Containing Precursor of $(Li_{7.20}Ga_{0.10})(La_{2.50}Ca_{0.50})Zr_2O_{12}$ In Example 3, a solution containing a precursor of a lithium composite oxide with x=0.10, and y=0.50 is prepared. The metallic compound solutions were used in weighed amounts of 8.6400 g for the 2-n-butoxyethanol solution A of 1 mol/kg of lithium nitride, 0.1000 g for the ethyl alcohol solution of 1 mol/kg of gallium nitride n-hydrate (n=5.5; Kojundo Chemical Laboratory Co., Ltd., 3N), 2.5000 g for the 2-n-butoxyethanol solution of 1 mol/kg of lanthanum nitride hexahydrate, 0.5000 g for the 2-n-butoxyethanol solution of 1 mol/kg of calcium nitride tetrahydrate, and 2.2857 g for the 2-n-butoxyethanol solution of 1 mol/kg of zirconium tetra-n-butoxide. After dropping a magnetic stirrer bar, the mixture was stirred at room temperature for 30 minutes using a magnetic stirrer, and a precursor-containing solution of Example 3 was obtained.

Example 4: Solution Containing Precursor of $(Li_{4.50}Ga_{1.00})(La_{2.50}Ca_{0.50})Zr_2O_{12}$ In Example 4, a solution containing a precursor of a lithium composite oxide with x=1.00, and y=0.50 is prepared. The metallic compound solutions were used in weighed amounts of 5.4000 g for the 2-n-butoxyethanol solution A of 1 mol/kg of lithium nitride, 1.0000 g for the ethyl alcohol solution of 1 mol/kg of gallium nitride n-hydrate (n=5.5; Kojundo Chemical Laboratory Co., Ltd., 3N), 2.5000 g for the 2-n-butoxyethanol solution of 1 mol/kg of lanthanum nitride hexahydrate, 0.5000 g for the 2-n-butoxyethanol solution of 1 mol/kg of calcium nitride tetrahydrate, and 2.2857 g for the 2-n-butoxyethanol solution of 1 mol/kg of zirconium tetra-n-butoxide. After dropping a magnetic stirrer bar, the mixture was stirred at room temperature for 30 minutes using a magnetic stirrer, and a precursor-containing solution of Example 4 was obtained.

Example 5: Solution Containing Precursor of $(Li_{5.55}Ga_{0.50})(La_{2.95}Ca_{0.05})Zr_2O_{12}$ In Example 5, a solution containing a precursor of a lithium composite oxide with x=0.50, and y=0.05 is prepared. The metallic compound solutions were used in weighed amounts of 6.6600 g for the 2-n-butoxyethanol solution A of 1 mol/kg of lithium nitride, 0.5000 g for the ethyl alcohol solution of 1 mol/kg of gallium nitride n-hydrate (n=5.5; Kojundo Chemical Laboratory Co., Ltd., 3N), 2.9500 g for the 2-n-butoxyethanol solution of 1 mol/kg of lanthanum nitride hexahydrate, 0.0500 g for the 2-n-butoxyethanol solution of 1 mol/kg of calcium nitride tetrahydrate, and 2.2857 g for the 2-n-butoxyethanol solution of 1 mol/kg of zirconium tetra-n-butoxide. After dropping a magnetic stirrer bar, the mixture was stirred at room temperature for 30 minutes using a magnetic stirrer, and a precursor-containing solution of Example 5 was obtained.

Example 6: Solution Containing Precursor of $(Li_{5.87}Ga_{0.40})(La_{2.93}Ca_{0.07})Zr_2O_{12}$ In Example 6, a solution containing a precursor of a lithium composite oxide with x=0.40, and y=0.07 is prepared. The metallic compound solutions were used in weighed amounts of 7.0400 g for the 2-n-butoxyethanol solution A of 1 mol/kg of lithium nitride, 0.4000 g for the ethyl alcohol solution of 1 mol/kg of gallium nitride n-hydrate (n=5.5; Kojundo Chemical Laboratory Co., Ltd., 3N), 2.9300 g for the 2-n-butoxyethanol solution of 1 mol/kg of lanthanum nitride hexahydrate, 0.0700 g for the 2-n-butoxyethanol solution of 1 mol/kg of calcium nitride tetrahydrate, and 2.2857 g for the 2-n-butoxyethanol solution of 1 mol/kg of zirconium tetra-n-butoxide. After dropping a magnetic stirrer bar, the mixture was stirred at room temperature for 30 minutes using a magnetic stirrer, and a precursor-containing solution of Example 6 was obtained.

Comparative Example 1: Solution Containing Precursor of $(Li_{6.86}Ga_{0.05})(La_{2.99}Ca_{0.01})Zr_2O_{12}$ In Comparative Example 1, a solution containing a precursor of a lithium composite oxide with x=0.05, and y=0.01 is prepared. The metallic compound solutions were used in weighed amounts of 8.2320 g for the 2-n-butoxyethanol solution A of 1 mol/kg of lithium nitride, 0.0500 g for the ethyl alcohol solution of 1 mol/kg of gallium nitride n-hydrate (n=5.5; Kojundo Chemical Laboratory Co., Ltd., 3N), 2.9900 g for the 2-n-butoxyethanol solution of 1 mol/kg of lanthanum nitride hexahydrate, 0.0100 g for the 2-n-butoxyethanol solution of 1 mol/kg of calcium nitride tetrahydrate, and 2.2857 g for the 2-n-butoxyethanol solution of 1 mol/kg of zirconium tetra-n-butoxide. After dropping a magnetic stirrer bar, the mixture was stirred at room temperature for 30 minutes using a magnetic stirrer, and a precursor-containing solution of Comparative Example 1 was obtained. Note that x is 0.05 in Comparative Example 1, and $0.1 \leq x \leq 1$ is not satisfied in formula (1).

Comparative Example 2: Solution Containing Precursor of $(Li_{7.29}Ga_{0.07})(La_{2.50}Ca_{0.50})Zr_2O_{12}$ In Comparative Example 2, a solution containing a precursor of a lithium composite oxide with x=0.07, and y=0.50 is prepared. The metallic compound solutions were used in weighed amounts of 8.7480 g for the 2-n-butoxyethanol solution A of 1 mol/kg of lithium nitride, 0.0700 g for the ethyl alcohol solution of 1 mol/kg of gallium nitride n-hydrate (n=5.5; Kojundo Chemical Laboratory Co., Ltd., 3N), 2.5000 g for the 2-n-butoxyethanol solution of 1 mol/kg of lanthanum nitride hexahydrate, 0.5000 g for the 2-n-butoxyethanol solution of 1 mol/kg of calcium nitride tetrahydrate, and 2.2857 g for the 2-n-butoxyethanol solution of 1 mol/kg of zirconium tetra-n-butoxide. After dropping a magnetic stirrer bar, the mixture was stirred at room temperature for 30 minutes using a magnetic stirrer, and a precursor-containing solution of Comparative Example 2 was obtained. Note that x is 0.07 in Comparative Example 2, and $0.1 \leq x \leq 1$ is not satisfied in formula (1).

Comparative Example 3: Solution Containing Precursor of $(Li_{5.20}Ga_{0.60}) La_3Zr_2O_{12}$ In Comparative Example 3, a solution containing a precursor of a lithium composite oxide with x≤0.60, and y=0.00 is prepared. The metallic compound solutions were used in weighed amounts of 6.2400 g for the 2-n-butoxyethanol solution A of 1 mol/kg of lithium nitride, 0.6000 g for the ethyl alcohol solution of 1 mol/kg of gallium nitride n-hydrate (n=5.5; Kojundo Chemical Laboratory Co., Ltd., 3N), 3.0000 g for the 2-n-butoxyethanol solution of 1 mol/kg of lanthanum nitride hexahydrate, and 2.2857 g for the 2-n-butoxyethanol solution of 1 mol/kg of zirconium tetra-n-butoxide. After dropping a magnetic stirrer bar, the mixture was stirred at room temperature for 30 minutes using a magnetic stirrer, and a precursor-containing solution of Comparative Example 3 was obtained. Note that y is 0.00 in Comparative Example 3, and, with no calcium, $0.01 \leq y \leq 0.5$ is not satisfied in formula (1).

Comparative Example 4: Solution Containing Precursor of $(Li_{6.20}Ga_{0.50})(La_{2.30}Ca_{0.70})Zr_2O_{12}$ In Comparative Example 4, a solution containing a precursor of a lithium composite oxide with x=0.50, and y=0.70 is prepared. The metallic compound solutions were used in weighed amounts of 7.4400 g for the 2-n-butoxyethanol solution A of 1 mol/kg of lithium nitride, 0.5000 g for the ethyl alcohol solution of 1 mol/kg of gallium nitride n-hydrate (n=5.5; Kojundo Chemical Laboratory Co., Ltd., 3N), 2.3000 g for the 2-n-butoxyethanol solution of 1 mol/kg of lanthanum nitride hexahydrate, 0.7000 g for the 2-n-butoxyethanol solution of 1 mol/kg of calcium nitride tetrahydrate, and 2.2857 g for the 2-n-butoxyethanol solution of 1 mol/kg of zirconium tetra-n-butoxide. After dropping a magnetic stirrer bar, the mixture was stirred at room temperature for 30 minutes using a magnetic stirrer, and a precursor-containing solution of Comparative Example 4 was obtained. Note that y is 0.70 in Comparative Example 4, and $0.01 \leq y \leq 0.5$ is not satisfied in formula (1).

In the precursor-containing solutions of Examples 1 to 6 and Comparative Examples 1 to 4, the lithium source 2-n-butoxyethanol solution A of 1 mol/kg of lithium nitride is mixed in 1.2 times the molar ratio of the original theoretical composition of formula (1), taking into account the lithium that becomes abstracted during heating. The metallic compound solutions for other metallic element sources are mixed in the same molar ratios as specified in the theoretical composition.

Production of Solid Electrolyte Pellet

Solid electrolyte pellets for evaluation were produced using the precursor-containing solutions of Examples 1 to 6 and Comparative Examples 1 to 4 prepared above. First, the precursor-containing solution is charged into a titanium petri dish measuring 50 mm in inner diameter, and 20 mm in height. The petri dish is placed on a hot plate, and heated for 1 hour to remove the solvent on the hot plate with a temperature setting at 180° C. After setting the hot plate temperature to 360° C., the petri dish is heated for 30 minutes to burn and decompose most of the organic components. With a hot plate temperature set to 540° C., the petri dish is heated for 1 hour to burn and decompose any remaining organic component. The product is then allowed to cool to room temperature on the hot plate to obtain a 540° C. calcined product.

The 540° C. calcined product is transferred to an agate mortar, and thoroughly pulverized and mixed. A weighed 0.2000-g portion is compressed under a pressure of 0.624 $kN/mm^2$ (624 MPa) for 5 minutes using a mold (a dice equipped with an evacuation port having an inner diameter of 10 mm), and a 540° C. calcined pellet (a circular disc-shaped molded product of the 540° C. calcined product) is obtained.

The 540° C. calcined pellet is put in a magnesium oxide crucible, and fired at 800° C. for 8 hours in an electric muffle furnace after placing a magnesium oxide cap on the crucible. The pellet is taken out after the electric muffle furnace is allowed to cool to room temperature, and a solid electrolyte pellet for evaluation measuring about 9.5 mm in diameter, and about 800 m in thickness is obtained.

This procedure is performed for the precursor-containing solutions of Examples and Comparative Examples to produce solid electrolyte pellets of Examples 1 to 6 and Comparative Examples 1 to 4. The primary phase of the solid electrolytes of Examples 1 to 6 and Comparative Examples 1, 2, and 4 is a gallium- and calcium-substituted lithium lanthanum zirconate. The primary phase of the solid electrolyte of Comparative Example 3 is a gallium-substituted lithium lanthanum zirconate.

Evaluation of Solid Electrolyte Pellet

The solid electrolyte pellets of Examples and Comparative Examples were evaluated in the manner described below. The results are shown in FIG. 5. FIG. 5 is a table representing the lithium ion conductivity, and other evaluation results for Examples and Comparative Examples.

The diameter and the thickness of the solid electrolyte pellet were measured using a digital caliper CD67-S15PS (Mitsutoyo Corporation). The mass of the solid electrolyte pellet was measured using an analytical balance ME204T (Mettler-Toledo Inc.). The bulk density of the solid electrolyte pellet was calculated using the bulk density calculation formula (mathematical formula A) for porous body 2, by assuming that the density p of the solid electrolyte was 4,800 kg/m$^3$.

The solid electrolyte pellet was investigated for generation of any by-product, using an X-ray diffraction analyzer MRD (Philips).

The crystalline structure of the solid electrolyte pellet was confirmed from a Raman spectrum obtained with a Raman spectral device S-2000 (JEOL).

Figures 9, 10:
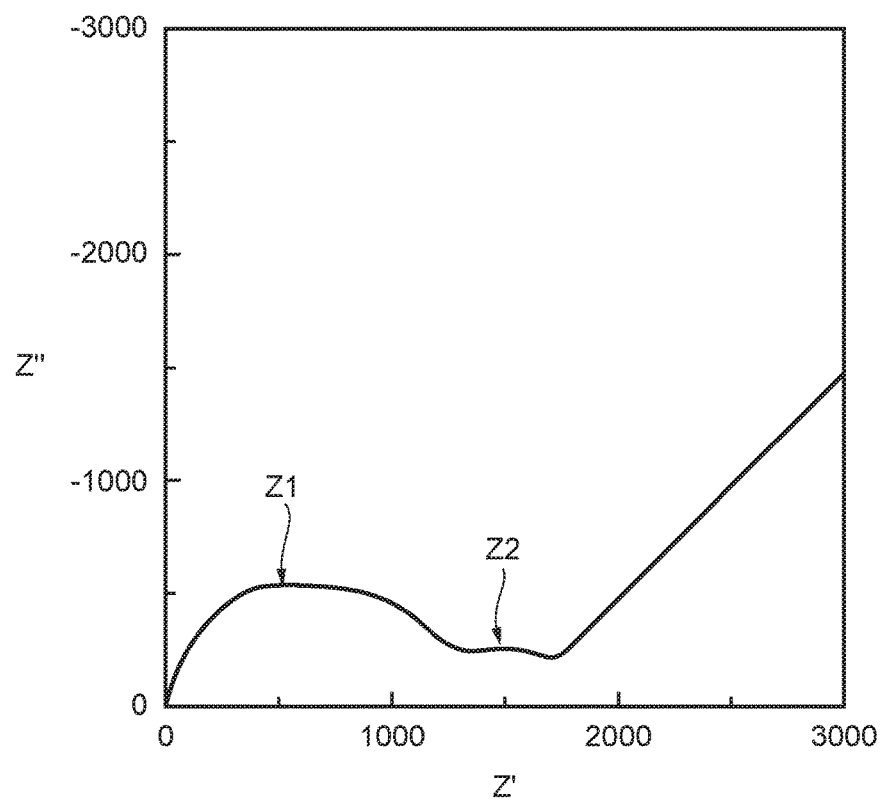
FIG. 9 is a graph representing a Cole-Cole plot, or an impedance spectrum of Example 5.
FIG. 10 is a table showing the evaluation results for the lithium batteries of Example 5 and Comparative Example 1.

Gold electrodes (ion blocking electrodes), measuring 8 mm in diameter, were fabricated on both sides of the solid electrolyte pellet by sputtering gold. The pellet was then measured for AC impedance using an impedance analyzer SI1260 (Solartron). With a lithium metal foil pressed against the gold electrodes on the both sides of the solid electrolyte pellet, the AC impedance was measured for the activated electrodes. Measurements were taken with an AC amplitude of 10 mV, and a frequency of $10^7$ Hz to $10^{-1}$ Hz. An example of the Cole-Cole plot obtained as an impedance spectrum is described below, taking Example 5 as an example. FIG. 9 is a graph representing the Cole-Cole plot, an impedance spectrum of a sample prepared by forming gold electrodes (ion blocking electrodes, φ=8 mm) on both sides of the solid electrolyte pellet of Example 5 by sputtering gold. In FIG. 9, the horizontal axis represents the wavenumber for the real component of impedance (Z'), and the vertical axis represents the imaginary component of impedance (Z"). In the spectrum shown in FIG. 9, Z1 represents the particle bulk component, and Z2 represents the grain boundary component. The spread of resistance in the low-frequency region is due to the ion blocking electrodes. The lithium ion conductivity (particle bulk conductivity, grain boundary conductivity, and total ion conductivity) was calculated from Z1 and Z2. The grain boundary resistance ratio was calculated by dividing the total ion conductivity by the grain boundary conductivity. These values were also calculated for other Examples and Comparative Examples by performing the same analysis.

Evaluation Results for Solid Electrolyte Pellet

The evaluation results are described with reference to FIG. 5.

Bulk Density

As shown in FIG. 5, the bulk density was about 53% in all of Examples 1 to 6. These solid electrolyte pellets were shown to be high ion conductors with a small grain boundary resistance, in which the crystal grains had a desirable contact for a bulk density of about 53%, and produced an open ion conduction path after being fired at a relatively low temperature of 800° C. The bulk density was 51% or more in Comparative Examples 1 to 4.

XRD (X-Ray Diffraction) Analysis

Figure 6:
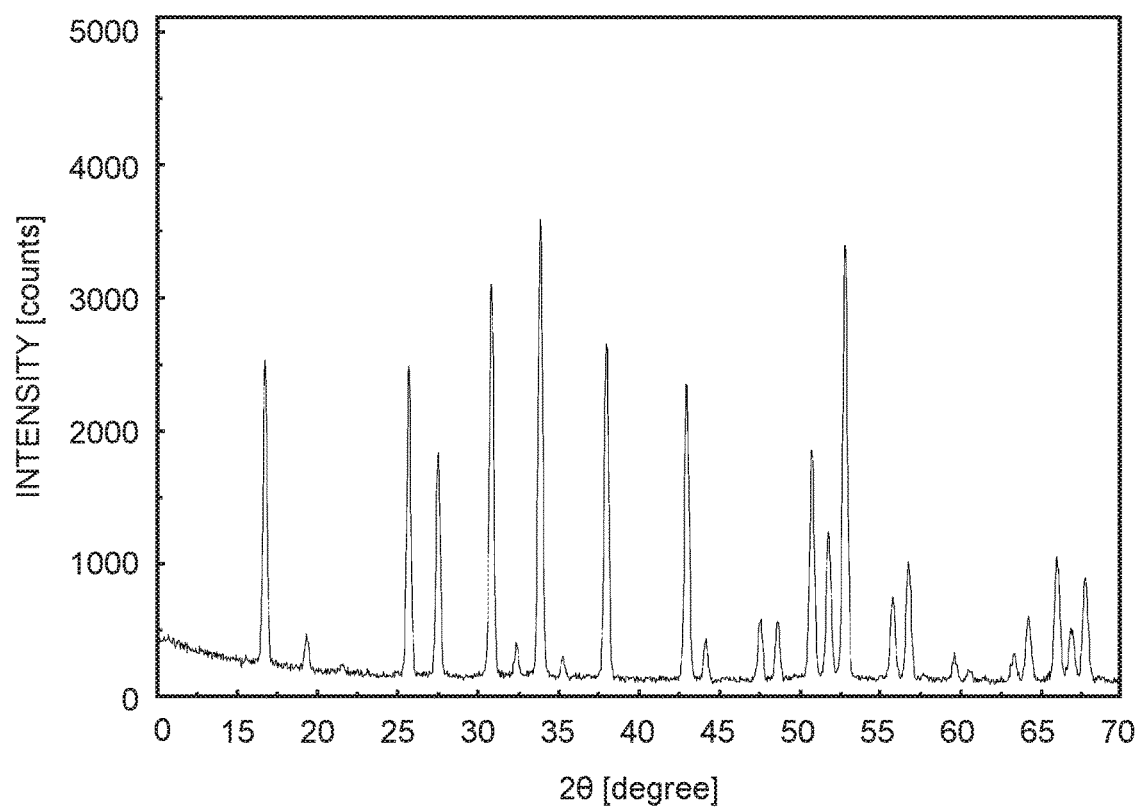
FIG. 6 is a graph representing an X-ray diffraction chart of Example 5.

FIG. 6 is a graph representing an X-ray diffraction chart of Example 5.

In FIG. 6, the horizontal axis represents 2θ, and the vertical axis represents intensity. As shown in FIG. 6, in Example 5, the only diffraction peaks observed for the lithium lanthanum zirconate were the peaks attributed to the Ga (gallium)-substituted Li (lithium) site, and the Ca (calcium)-substituted La (lanthanum) site, and a diffraction peak derived from a foreign substance was not detected. A diffraction peak derived from a foreign substance was not detected also in Examples 1 to 4, and in Example 6, as in Example 5. Specifically, as shown in FIG. 5, there was no detectable foreign substance in Examples 1 to 6, and the content of foreign substance was below the lower detection limit of the X-ray diffraction analyzer. These results for Examples 1 to 6 show that generation of a by-product was reduced, and the purity of the solid electrolyte improved.

For analysis of the X-ray diffraction chart, the result was compared with the diffraction pattern of a garnet-type crystal $Li_5La_3Nb_2O_{12}$ (JCPDS No. 84-1753). The overall diffraction pattern was the same, though 2θ shifted about 0.2° toward the lower angle side on the whole. It can be said from this that the lithium lanthanum zirconate of the embodiment containing Ga and Ca substituting the Li site and the La site, respectively, is a garnet-type crystal.

On the other hand, a diffraction peak of a by-product ($La_2Zr_2O_7$) was detected in Comparative Example 1, in addition to the diffraction peaks of the primary phase observed in Examples 1 to 6. Diffraction peaks of by-products ($La_2Zr_2O_7$, and $LiGaO_2$) were detected in Comparative Example 2, as in Comparative Example 1. In Comparative Example 3, a diffraction peak was observed for the primary phase (lithium lanthanum zirconate with the Ga-substituted Li site), and there was no detectable diffraction peak derived from a foreign substance. A diffraction peak of a by-product ($LiGaO_2$) was detected in Comparative Example 4, as in Comparative Example 1.

Figure 7:
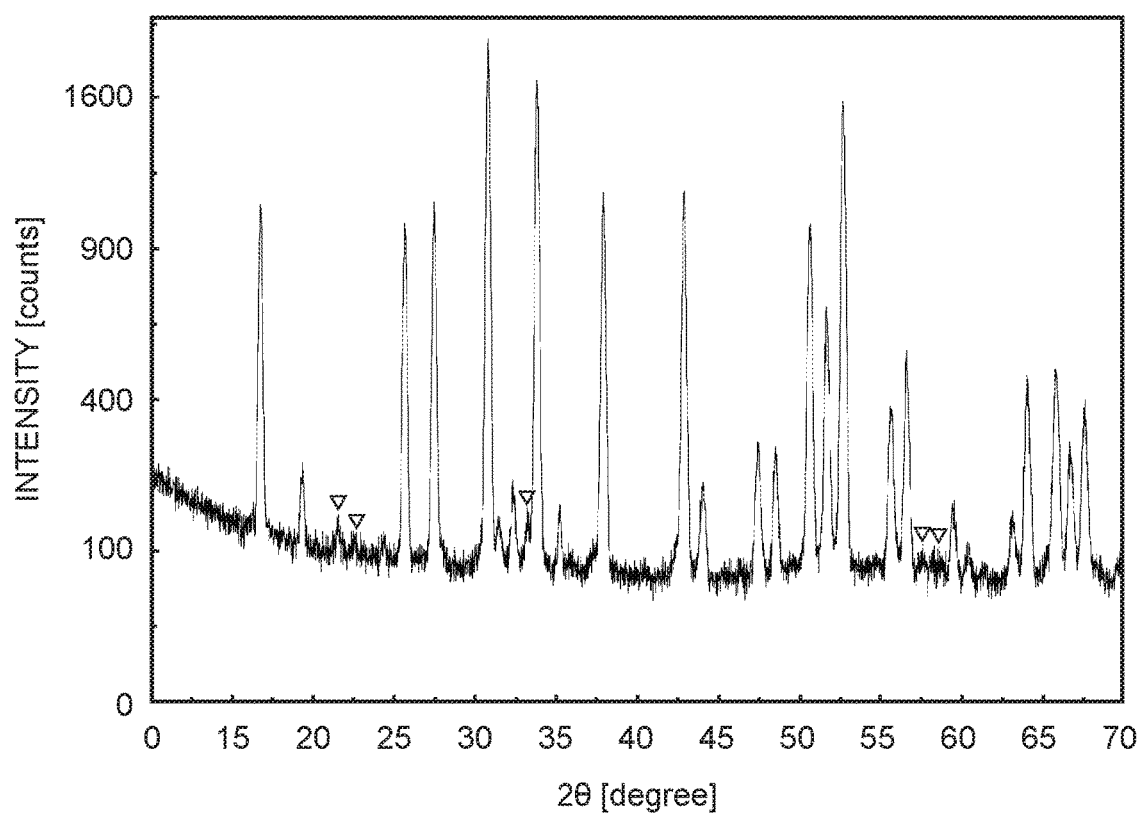
FIG. 7 is a graph representing an X-ray diffraction chart of Comparative Example 4.

The method used to analyze the by-product is described with reference to the X-ray diffraction chart of Comparative Example 4. FIG. 7 is a graph representing an X-ray diffraction chart of Comparative Example 4. As shown in FIG. 7, small peaks were observed in Comparative Example 4, in addition to the peaks derived from the Ga-substituted Li site and the Ca-substituted La site of the lithium lanthanum zirconate observed in Example 5. Specifically, a total of five such peaks were recognized at about 22° (two in the vicinity of 22°), about 33°, about 56°, and about 58° on the horizontal axis (indicated by inverted triangle in FIG. 7). These peaks were collated with the ICDD (International Centre for Diffraction Data) database, and the foreign substance was identified as $LiGaO_2$. The foreign substance was identified in the same fashion for Comparative Examples 1 and 2.

As demonstrated above, generation of a by-product was recognized in Comparative Examples 1, 2, and 4 in which the primary phase was the lithium lanthanum zirconate with the Ga-substituted Li site and the Ca-substituted La site, as shown in FIG. 5, and the purity was shown to be inferior to the purities observed for the solid electrolytes of Examples 1 to 6.

Raman Scattering Analysis

Figure 8:
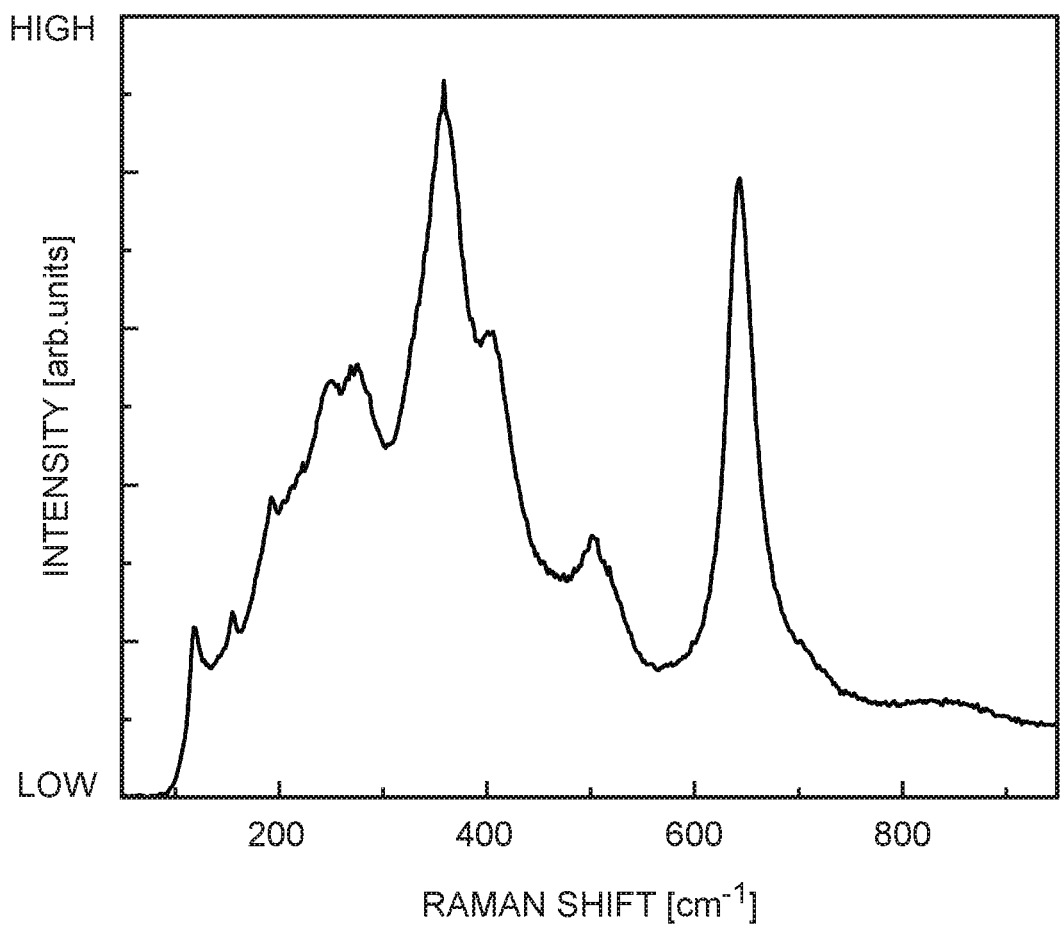
FIG. 8 is a graph representing a Raman spectrum of Example 5.

FIG. 8 is a graph representing a Raman spectrum of Example 5. In FIG. 8, the horizontal axis represents wavenumber, and the vertical axis represents intensity (increasing intensities upward). As shown in FIG. 8, in Example 5, a broad Raman spectrum was obtained that derived from the 24d site in the vicinity of 370 cm$^{-1}$, and the 48g and 96h sites in the vicinity of 260 cm$^{-1}$ and 290 cm$^{-1}$. This is suggestive of the crystalline structure having a cubical crystal garnet-type structure. Similar Raman spectra were observed in Examples 1 to 4, Example 6, and Comparative Examples 1 to 4. These results showed that the crystalline structure was of a cubical crystal garnet-type in Examples 1 to 6, and in Comparative Examples 1 to 4.

Ion Conductivity

As shown in the column under the heading lithium ion conductivity in FIG. 5, Examples 1 to 6 had desirable grain boundary conductivity values of $2.1\times10^{-4}$ S/cm to $2.2\times10^{-4}$ S/cm, and the grain boundary resistance ratio had reduced values of about 45% to 48%, showing that the grain boundary resistance was reduced in Examples 1 to 6. The total ion conductivity was also desirable with the value of about $1.0\times10^{-4}$ S/cm, showing that the lithium ion conductivity improved.

On the other hand, in Comparative Examples 1 to 4, the grain boundary conductivity was one order of magnitude smaller ($1.9\times10^{-5}$ S/cm to $2.0\times10^{-5}$ S/cm) than in Examples, and the grain boundary resistance ratio exceeded 85% in all of Comparative Examples 1 to 4, showing that the grain boundary resistance was higher than in Examples. The total ion conductivity was about $1.7\times10^{-5}$ S/cm, showing that the lithium ion conductivity was inferior to that observed in Examples.

Production of Lithium Battery

A lithium battery of Example 5 was produced using the Example 5 solution containing a solid electrolyte, and a precursor of the solid electrolyte. Specifically, $LiCoO_2$ was used as the positive electrode active material, a Li foil (thickness of about 150 μm) was used as the negative electrode layer, and a Cu (copper) foil (thickness of about 100 μm) was used as the first collector electrode and the second collector electrode. The complex had a thickness of about 150 μm. The solid electrolyte layer had a thickness of about 15 μm, and an effective diameter of about 8 mm. A lithium battery of Comparative Example 1 was also produced in the same manner as for the lithium battery of Example 5, except that the solution of Comparative Example 1 containing a solid electrolyte, and a precursor of the solid electrolyte was used.

Evaluation of Battery Characteristics

The lithium batteries of Example 5 and Comparative Example 1 were charged and discharged at a charge-discharge rate of 0.1 C in a 25° C. environment. The charge curve showed a plateau at 3.9 V in both the lithium battery of Example 5 and the lithium battery of Comparative Example 1. The potential was about the same as that of the lithium elimination reaction of HT (high-temperature phase)—$LiCoO_2$.

The Lithium batteries of Example 5 and Comparative Example 1 were also measured for charge-discharge capacity after repeated charge and discharge. Specifically, the batteries were measured for the initial charge-discharge capacity, and the charge-discharge capacity after 100 cycles of repeated charge and discharge, and the percentage of remaining discharge capacity after 100 cycles of charge and discharge was calculated. The results are shown in FIG. 10. FIG. 10 is a table showing the evaluation results for the lithium batteries of Example 5 and Comparative Example 1. The theoretical capacity (amount of abstracted lithium atoms in the composition of $LiCoO_2$) is 137 mAh/g.

As shown in FIG. 10, the initial charge-discharge capacity maintained about 80% of the theoretical capacity 137 mAh/g in the lithium battery of Example 5. The percentage remaining discharge capacity after 100 cycles of charge and discharge was 97%. These results showed that the lithium battery of Example 5 had stable cycle characteristics.

On the other hand, the initial charge-discharge capacity was less than 65% of the theoretical capacity 137 mAh/g in the lithium battery of Comparative Example 1. The percentage of remaining discharge capacity after 100 cycles of charge and discharge was as low as 79%. As can be seen from this result, the cycle characteristics of the lithium battery of Comparative Example 1 were less stable than the cycle characteristics of the lithium battery of Example 5.

Examples 7 to 12

The following describes the lithium ion conductivity of a solid electrolyte pellet of when a low-purity lithium compound is used as a raw material of the solid electrolyte 3, with reference to FIG. 11. FIG. 11 is a table showing the compositions of the solid electrolytes according to Examples and Comparative Examples, and the evaluation results. The parameters already described for the Examples above will not be described again.

Preparation of Metallic Compound Solution 2-n-Butoxyethanol Solution B of 1 Mol/Kg Lithium Nitride A 2-n-butoxyethanol solution B of 1 mol/kg of lithium nitride was prepared in the same manner as in the foregoing Examples, except that a lithium nitride having 99.80% purity (Kanto Kagaku, Cica grade) was used instead of the lithium nitride having 99.95% purity (Kanto Kagaku 3N5) used in Examples. The other metallic compound solutions are the same as those prepared in Examples.

Preparation of Solution Containing Precursor of Solid Electrolyte

The metallic compound solutions were used to prepare solid electrolyte precursor-containing solutions of Examples 7 to 12 and Comparative Examples 5 to 8, with the x and y values of the formula $(Li_{7-3x+y}Ga_x)(La_{3-y}Ca_y)Zr_2O_{12}$ (formula (1)) shown in FIG. 11. The solution of Example 7 is the same as the solution prepared for Example 1, including the composition of the formula (1), and was prepared in the same manner, except that the 2-n-butoxyethanol solution B of 1 mol/kg of lithium nitride was used instead of the 2-n-butoxyethanol solution A of 1 mol/kg of lithium nitride. Similarly, Examples 8 to 12, and Comparative Examples 5 to 8 correspond to Examples 2 to 6, and Comparative Examples 1 to 4, respectively, and the solutions were prepared using the same method, including the composition of the formula (1), except that the 2-n-butoxyethanol solution B of 1 mol/kg of lithium nitride was used as in Example 7 corresponding to Example 1.

In the precursor-containing solutions of Examples 7 to 12 and Comparative Examples 5 to 8, the lithium source 2-n-butoxyethanol solution B of 1 mol/kg of lithium nitride was mixed in 1.2 times the molar ratio of the original theoretical composition of formula (1), taking into account the lithium that becomes abstracted during heating. The metallic compound solutions for other metallic element sources were mixed in the same molar ratios as specified in the theoretical composition.

Evaluation of Solid Electrolyte Pellet

Solid electrolyte pellets of Examples 7 to 12, and Comparative Examples 5 to 8 were produced, and evaluated in the same manner as in the foregoing Examples. The results are presented in FIG. 11. The evaluation results for bulk density and foreign substance are omitted because these were no different from the results for the corresponding Examples and Comparative Examples.

As shown in the column under the heading lithium ion conductivity in FIG. 11, the grain boundary conductivity was $7.6 \times 10^{-5}$ S/cm to $9.3 \times 10^{-5}$ S/cm, and was on the order of $10^{-5}$ S/cm in Examples 7 to 12. The grain boundary resistance ratio had reduced values of 49% to 56%. These results showed that increase of grain boundary resistance can be reduced, and the lithium ion conductivity can be maintained even when the low-purity lithium compound is used as a raw material.

The grain boundary conductivity was maintained, and the particle bulk conductivity was about $1.1 \times 10^{-4}$ S/cm in Examples 11 and 12 in which $0.3 \le x \le 0.7$, and $0.04 \le y \le 0.08$ in formula (1). These results for Examples 11 and 12 showed that the lithium ion conductivity inside the particle bulk was higher than in Examples 7 to 10, even though the low-purity lithium compound was used as a raw material, and the pellet was fired at a relatively low temperature of 800° C.

On the other hand, in Comparative Examples 5 to 8, the grain boundary conductivity was one order of magnitude smaller ($4.0 \times 10^{-6}$ S/cm to $6.0 \times 10^{-6}$ S/cm) than in Examples 7 to 12, and the grain boundary resistance ratio exceeded 92% in all of Comparative Examples 5 to 8, showing that the grain boundary resistance was higher than in Examples. The total ion conductivity was also one order of magnitude smaller, showing that the lithium ion conductivity was inferior to that observed in Examples.

Second Embodiment

Other Battery

Figure 12:
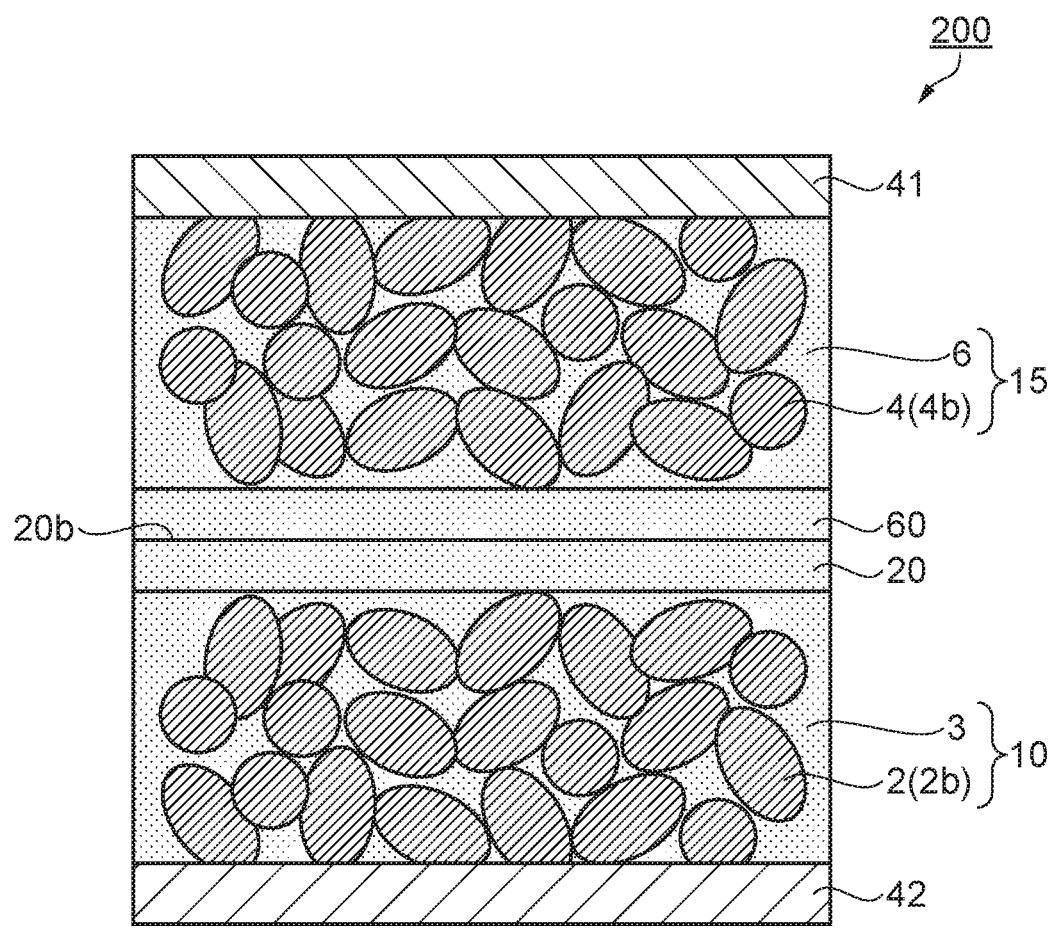
FIG. 12 is a schematic cross sectional view showing a configuration of a lithium battery as a battery according to Second Embodiment.

A battery of the present embodiment is described below with reference to FIG. 12. The present embodiment is described through the case where the battery is a lithium battery. FIG. 12 is a schematic cross sectional view showing a configuration of a lithium battery as a battery according to Second Embodiment. The same constituent members described in First Embodiment are given the same reference numerals, and will not be described again.

As shown in FIG. 12, a lithium battery 200 of the present embodiment includes a first collector electrode 41 and a second collector electrode 42 representing a pair of collector electrodes, and a complex 10 and a complex 15 provided between the first collector electrode 41 and the second collector electrode 42, with the complex 10 disposed on the positive electrode side, and the complex 15 disposed on the negative electrode side. The lithium battery 200 is formed by combining and contacting a solid electrolyte layer 20 and a solid electrolyte layer 60 on a second surface 20b.

The lithium battery 200 includes a negative electrode active material 4b between the solid electrolyte layer 20 and the first collector electrode 41. The negative electrode active material 4b constitutes a porous body 4 having a plurality of pores. Inside the pores of the porous body 4 is provided a solid electrolyte 6, and the complex 15 includes the porous body 4 and the solid electrolyte 6. In the complex 15, the surface of the porous body 4, including the pores, is compounded in contact with the solid electrolyte 6, as with the case of the complex 10. The solid electrolyte layer 60 is provided between the solid electrolyte layer 20 and the complex 15.

The complex 15 and the first collector electrode 41 are in contact with each other. The porous body 4 is exposed on the surface of the complex 15 that is in contact with the first collector electrode 41. This provides an electrical connection between the porous body 4 and the first collector electrode 41.

The configuration of the lithium battery 200 from the second collector electrode 42 to the solid electrolyte layer 20 is the same as in the lithium battery 100 of First Embodiment.

The material forming the negative electrode active material 4b may be, for example, a lithium composite metal oxide such as $Li_4Ti_5O_{12}$, and $Li_2Ti_3O_7$. In the lithium battery 200, $Li_4Ti_5O_{12}$ is used as the negative electrode active material 4b. The porous body 4 may be formed by using the negative electrode active material 4b, using the same method used for the porous body 2.

The garnet-type ion conductive solid electrolyte represented by the formula (1) is used as the material of the solid electrolyte 6, as with the case of the solid electrolyte 3. The material of the solid electrolyte 6 is not required to have the same composition as the material of the solid electrolyte 3, provided that the solid electrolyte represented by the formula (1) is contained.

The solid electrolyte layer 60 has a thickness of preferably, for example, about 50 nm to about 100 μm. However, the solid electrolyte layer 60 may have any desired thickness as may be decided according to the material characteristics, and design. The surface of the solid electrolyte layer 60 on the negative electrode layer 30 side may have an irregular structure, for example, such as a trench, a grating, and a pillar, as required, using a combination of different molding methods and working methods. The solid electrolyte layer 60 is not limited to a single layer, and may have a multilayer structure with, for example, a glass electrolyte layer formed on a crystalline layer to prevent shorting.

The lithium battery 200 according to the present embodiment described above can exhibit the following effects, in addition to the effects described in First Embodiment. Because the complex 15 can be formed also on the negative electrode layer 30 side, transfer of lithium ions occurs between the negative electrode active material 4b (porous body 4) and the solid electrolyte layer 60. The complex 15 can thus desirably exhibit its function, and the output and the capacity of the lithium battery 200 can improve.

The invention is not limited to the embodiments described above, and various changes and improvements may be made to the foregoing embodiments. The following describes variations.

Third Embodiment

Electronic Device

An electronic device of an embodiment of the invention includes the battery as a power supply. Examples of the electronic device include wrist watch-style wearable devices, head-mount displays and other such displays worn on the head, head-up displays, mobile phones, portable information terminals, laptop personal computers, digital cameras, video cameras, music players, and wireless headphones. The electronic device of the embodiment of the invention may have other functions, including, for example, data communication functions, gaming functions, sound recording and playback functions, and dictionary functions.

Figure 13:
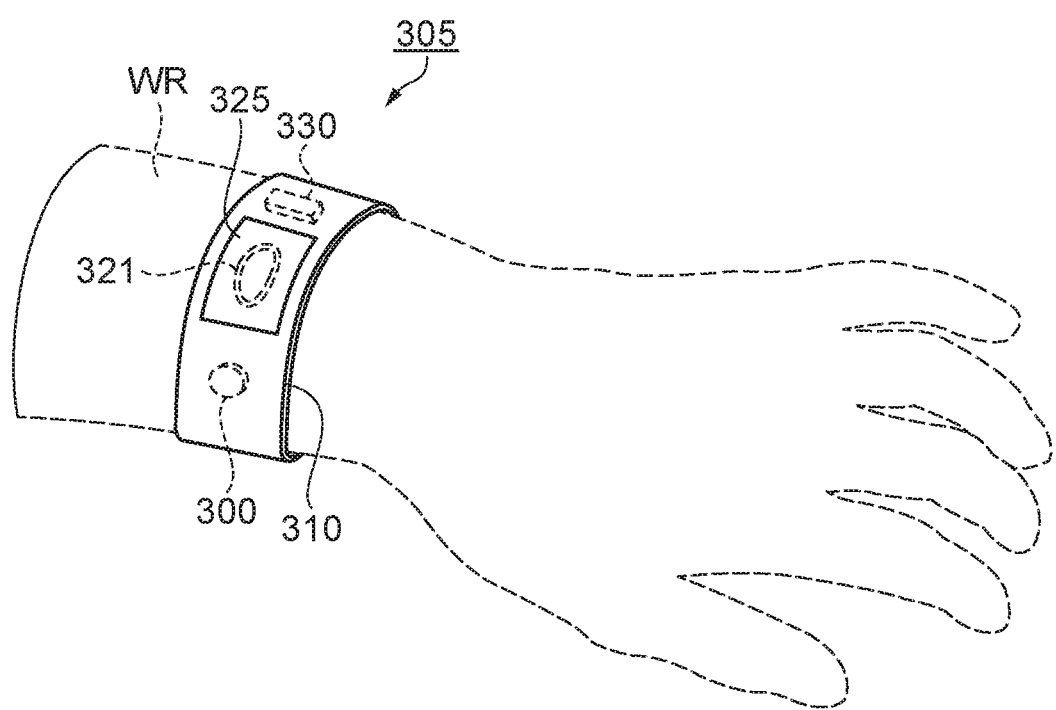
FIG. 13 is a schematic diagram representing a configuration of a wearable device according to Third Embodiment.

The electronic device according to the present embodiment is described below with reference to FIG. 13. In the present embodiment, the electronic device is described through the case of a wearable device. FIG. 13 is a schematic diagram representing a configuration of the wearable device according to Third Embodiment.

As illustrated in FIG. 13, a wearable device 305 of the present embodiment is an information device intended for use on the human wrist WR by being worn with a band 310 in the same fashion as a wrist watch is worn. The wearable device 305 includes a lithium battery 300, a display section 325, a pulse sensor 321, and a processing section 330.

The display section 325 displays information such as pulse and time, and is disposed on the outer side of the band 310 so that a user wearing the wearable device 305 can read the displayed information. The lithium battery 300 and the processing section 330 are installed inside the band 310. The pulse sensor 321 is disposed on the inner side (wrist WR side) of the band 310 so as to contact the wrist WR while the device is worn. The pulse sensor 321 measures the pulse of the wearer through the wrist WR, and the display section 325 displays the pulse and other information after arithmetic processes by the processing section 330.

The lithium battery 300 serves as a power supply for supplying power to the device components, including the display section 325, the pulse sensor 321, and the processing section 330. With its small size and large battery capacity, the lithium battery 300 is preferred for this purpose. The present embodiment described the wrist watch-style wearable device as an example of the wearable device 305. However, the invention is not limited to this. The wearable device may be a device that is attached to other body parts, for example, such as the ankle, head, ear, and lower back.

The invention can provide an electronic device that includes the small, high-quality battery as a power supply.

Fourth Embodiment

Vehicle

A vehicle of an embodiment of the invention includes the battery as a power supply. Examples of the vehicle include automobiles, bikes, forklifts, and flying objects such as unattended airplanes.

The invention can provide a vehicle that includes the small, high-quality battery as a power supply.

Variation 1

In First Embodiment, the electrode disposed between the solid electrolyte layer 20 and the second collector electrode 42 is not limited to the complex 10, and may be a porous body containing the positive electrode active material 2b.

The entire disclosure of Japanese Patent Application No. 2016-170558, filed Sep. 1, 2016 is expressly incorporated by reference herein.

What is claimed is:

1. An electrolyte represented by the following formula (1):

$$(Li_{7-3x+y}Ga_x)(La_{3-y}Ca_y)Zr_2O_{12} \qquad (1)$$

wherein $0.1 \leq x \leq 1$, and $0.01 \leq y \leq 0.5$.

2. The electrolyte according to claim 1, wherein $0.3 \leq x \leq 0.7$, and $0.04 \leq y \leq 0.08$ in the formula (1).

3. A battery comprising:
a first collector electrode;
a complex; and
an electrolyte provided between the first collector electrode and the complex, and represented by $(Li_{7-3x+y}Ga_x)(La_{3-y}Ca_y)Zr_2O_{12}$, wherein $0.1 \leq x \leq 1$, and $0.01 \leq y \leq 0.5$.

4. The battery according to claim 3, wherein the complex includes a positive electrode active material.

5. The battery according to claim 3, wherein the complex includes the electrolyte.

6. The battery according to claim 5, wherein the complex is provided between the electrolyte and a second collector electrode.

7. The battery according to claim 4, wherein the positive electrode active material constitutes a porous body.

8. The battery according to claim 7, wherein the electrolyte is provided inside a pore of the porous body.

9. The battery according to claim 3, comprising a negative electrode active material between the electrolyte and the first collector electrode.

10. An electronic device comprising the battery of claim 3.

11. A vehicle comprising the battery of claim 3.

* * * * *